(12) United States Patent
Tanaka

(10) Patent No.: US 7,816,816 B2
(45) Date of Patent: Oct. 19, 2010

(54) SEMICONDUCTOR DEVICE

(75) Inventor: Akio Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 389 days.

(21) Appl. No.: 11/912,688

(22) PCT Filed: Apr. 27, 2006

(86) PCT No.: PCT/JP2006/308819

§ 371 (c)(1),
(2), (4) Date: Oct. 26, 2007

(87) PCT Pub. No.: WO2006/118184

PCT Pub. Date: Nov. 9, 2006

(65) Prior Publication Data

US 2009/0085645 A1    Apr. 2, 2009

(30) Foreign Application Priority Data

Apr. 28, 2005  (JP)  ............................ 2005-130913

(51) Int. Cl.
*H01H 47/32* (2006.01)
*G01R 31/02* (2006.01)
(52) U.S. Cl. .................. 307/131; 324/512; 324/537
(58) Field of Classification Search .......... 324/512, 324/537, 755, 765; 714/424; 438/10, 11; 257/48

See application file for complete search history.

(56) References Cited

U.S. PATENT DOCUMENTS 5,132,806 A * 7/1992 Kitamura et al. ............... 386/1

| | | | | |
|---|---|---|---|---|
| 5,883,521 A * | 3/1999 | Nishikawa | ................... | 324/765 |
| 6,509,197 B1 * | 1/2003 | Satya et al. | ................... | 438/12 |
| 6,658,612 B1 * | 12/2003 | Park et al. | ................... | 714/724 |
| 7,061,305 B2 * | 6/2006 | Kim | ........................... | 327/535 |

FOREIGN PATENT DOCUMENTS

| JP | 3-235293 | 10/1991 |
|---|---|---|
| JP | 5-87936 | 4/1993 |
| JP | 5-308394 | 11/1993 |
| JP | 7-202961 | 8/1995 |
| JP | 2002-340853 | 11/2002 |
| JP | 2003-132678 | 5/2003 |
| JP | 2004-20325 | 1/2004 |
| JP | 2004-228836 | 8/2004 |
| JP | 2004-241101 | 8/2004 |
| JP | 2005-20119 | 1/2005 |

OTHER PUBLICATIONS 5.15-5.825-ghZ 0.18-um CMOS RRANSCIEVER for 802.11a wireless LAN, IEEE JSSC, vol. 38, No. 12, 2003, pp. 2221-2231.
Wireless communication of the 1G-bps class in the IEEE 802.15 TG3a.

* cited by examiner

*Primary Examiner*—Albert W Paladini
(74) *Attorney, Agent, or Firm*—Young & Thompson

(57) ABSTRACT

A plurality of circuit blocks are provided in a semiconductor device which collects and corrects impairment quantities of discretionary areas in a circuit group of various types having random couplings. The semiconductor device is provided with a detector, which is arranged in each circuit block and detects an electric signal of an element in the circuit block; a wiring wherein each detector output passes through; a plurality of switches for feeding the wiring with each detector output; and a buffer connected to the wiring and passes through a direct current voltage.

17 Claims, 23 Drawing Sheets

FIG. 18

| | N= | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|---|
| P-side BG Coarse-adjustment | C_4 | 1 | 1 | 1 | 1 | | | | | | | | | | | | | | | | |
| | C_3 | | | | | 1 | 1 | 1 | 1 | | | | | | | | | | | | |
| | COM | | | | | | | | | 1 | 1 | 1 | 1 | | | | | | | | |
| | C_1 | | | | | | | | | | | | | 1 | 1 | 1 | 1 | | | | |
| | C_0 | | | | | | | | | | | | | | | | | 1 | 1 | 1 | 1 |
| N-side BG Fine-adjustment | F_0 | 1 | | | | 1 | | | | 1 | | | | 1 | | | | 1 | | | |
| | F_1 | | 1 | | | | 1 | | | | 1 | | | | 1 | | | | 1 | | |
| | COM | | | 1 | | | | 1 | | | | 1 | | | | 1 | | | | 1 | |
| | F_3 | | | | 1 | | | | 1 | | | | 1 | | | | 1 | | | | 1 |
| P-side V=iΔ | i= | 16 | 16 | 16 | 16 | 12 | 12 | 12 | 12 | 8 | 8 | 8 | 8 | 4 | 4 | 4 | 4 | 0 | 0 | 0 | 0 |
| N-side V=iΔ | i= | 6 | 7 | 8 | 9 | 6 | 7 | 8 | 9 | 6 | 7 | 8 | 9 | 6 | 7 | 8 | 9 | 6 | 7 | 8 | 9 |
| P-N | i= | 10 | 9 | 8 | 7 | 6 | 5 | 4 | 3 | 2 | 1 | 0 | -1 | -2 | -3 | -4 | -5 | -6 | -7 | -8 | -9 |
| P-N [mV] | V= | 156 | 141 | 125 | 109 | 94 | 78 | 63 | 47 | 31 | 16 | 0 | -16 | -31 | -47 | -63 | -78 | -94 | -109 | -125 | -141 |

Vres [mV] = 250
Δ [mV] = Vres/16 = 15.63

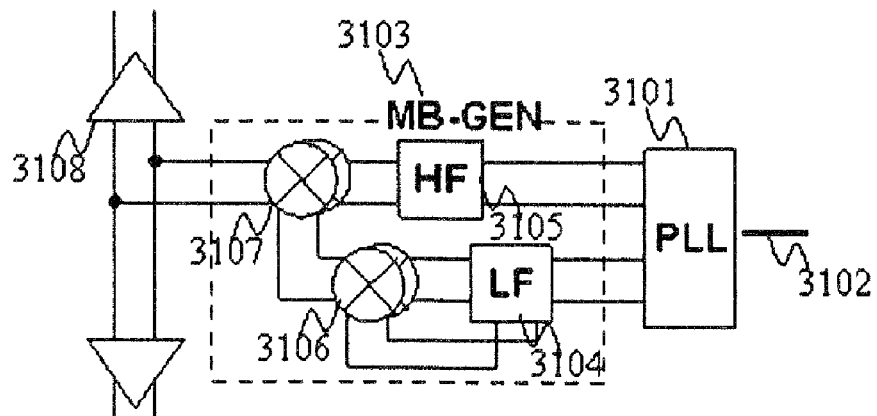
FIG. 34
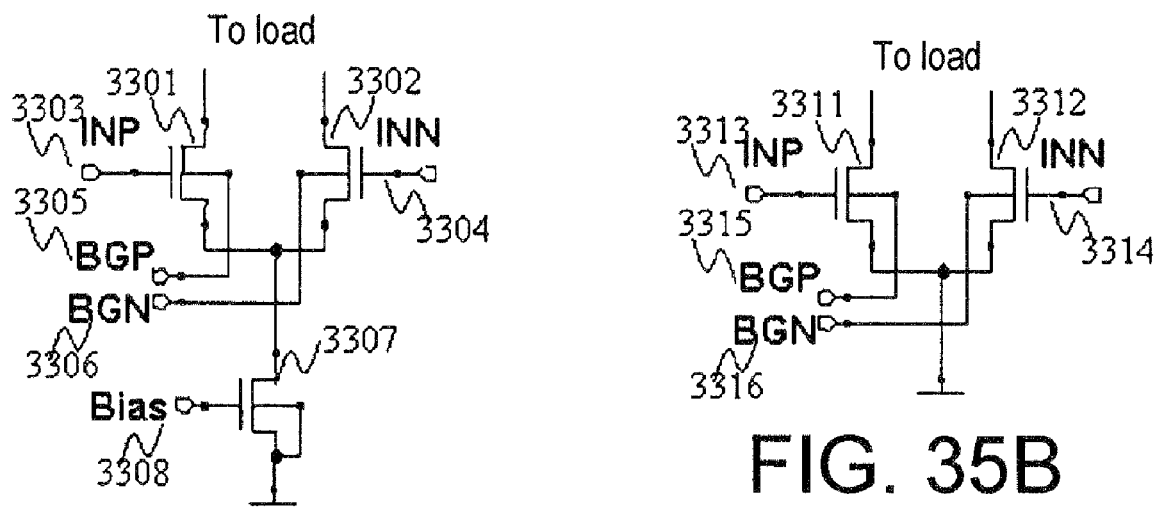
FIG. 35A
FIG. 35B
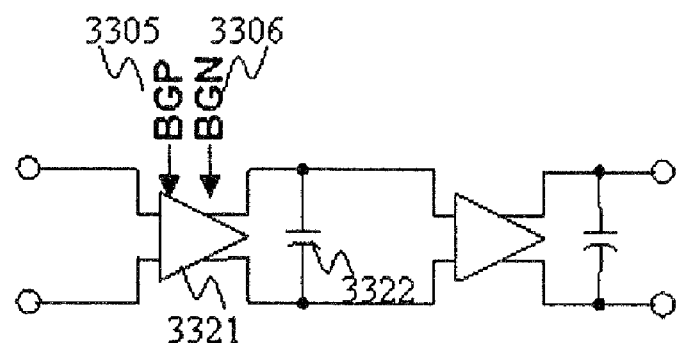
FIG. 35C

US 7,816,816 B2

SEMICONDUCTOR DEVICE

TECHNICAL FIELD

The present invention relates to a semiconductor device that can correct impairment such as DC (direct-current) offset or local (local oscillation component) leakage, I/Q mismatching, second order distortion, and spurious components that occur as a result of inter-element variation in, for example, transistors, LCR (inductor, capacitor and resistor) passive elements, or wiring. I/Q mismatching is mismatching between the in-phase (I) component and quadrature (Q) component. More particularly, the present invention relates to a semiconductor device for correcting variation that is suitable for a system-on-chip (SoC), in which circuits such wireless/wired communication circuits, sensors, actuators, control circuits, and CPUs are integrated.

BACKGROUND ART

JP-A-2002-340853 discloses a device having the configuration shown in FIG. 1A as a semiconductor device for correcting variation in various electrical properties as described above. The device shown in FIG. 1A is provided with: sensor 3001, pseudo-resistor (R) 3002 and amplifier 3005 that are connected to sensor 3001, and switches 3003, 3004 connected in a series to sensor 3001 and pseudo-resistor 3002, respectively. Normally, switch 3003 connected in a series to sensor 3001 is ON, and switch 3004 on the side of pseudo-resistor 3002 is OFF, whereby only sensor 3001 is connected to amplifier 3005 and the signal of sensor 3001 is read by amplifier 3005. When performing correction, however, only switch 3004 on the pseudo-resistor 3002 side is ON, whereby the signal level of pseudo-resistor 3002 is read by way of amplifier 3005. Analog-to-digital converter (ADC) 3006 is connected in the stage following amplifier 3005, and ADC 3006 converts the output of amplifier 3005 to a digital signal. The correction of variation is realized by comparing the digitized sensor signal with the digitized pseudo-resistor signal.

JP-A-5-087936 discloses a configuration provided with a plurality of sensors 3010 along with switches 3011 connected in a series to each of these sensors 3010 and a single amplifier 3012 that is connected in common to sensors 3010. Amplifiers typically have variations in offset voltage, but in the example shown in FIG. 1B, instead of providing a plurality of amplifiers for the plurality of sensors 3010, the signals from the plurality of sensors 3010 are amplified by one amplifier 3012 while switching by means of switches 3011, whereby the contribution due to the offset voltage of amplifier 3012 is prevented from varying among the plurality of sensors 3011.

JP-A-3-235293 discloses an example that corrects variation in a semiconductor memory. The configuration disclosed in JP-A-3-235293 is provided with: a plurality of memory cells, switches connected to these memory cells, a bus for connecting together this plurality of switches, a reference circuit connected to the bus, and a sense-amplifier. The signal read-out from the memory cells is normally carried out with only the switch of a particular memory cell turned ON, the signal of this memory cell then appearing in the bus. The sense-amplifier connected to the bus amplifies and reads out this signal. On the other hand, the reference circuit is itself also provided with a switch, this switch being OFF during normal read-out. However, during correction of variation, only the switch of the reference circuit is ON, and only current of the reference circuit flows to the bus to be amplified by the sense-amplifier and then read out. Comparison of this signal from the reference circuit and the signals from the memory cells enables detection of the variation of each memory cell signal from the reference circuit signal.

As shown in FIG. 1C, the example shown in JP-A-7-202961 is provided with: mixer (MOD) 3015 supplied with local signal (LO), detection circuit (DC DET) for reading the dc voltage of the output of the mixer, and circuit (OFS. Cal.) 3017 for, according to the output of detection circuit 3016, adjusting the dc voltage of the baseband signal supplied from baseband circuit (BB Gen.) 3019. In addition, the circuit shown in FIG. 1C is further provided with circuit (OFS. Cal.) 3018 that works upon the dc voltage setting function of mixer 3015 itself. Local leakage (also called "carrier leakage") of the mixer is represented by the dc offset, and the local leakage can be reduced by measuring the dc offset and then compensating the offset.

As shown in FIG. 1D, the example shown in JP-A-2004-020325 is provided with: sensor 3021, a plurality of read-out circuits 3022 that read the data from the sensor, multilevel voltage generator (MLVG) 3023 for correcting the variation of the sensor, analog bus 3024 for distributing the multilevel voltages from multilevel voltage generator 3023 to all read-out circuits 3022, wiring 3025 for collecting at one point the signals from read-out circuits 3022, and amplifier 3026 connected to wiring 3025 for extracting a signal outside the chip. Multiplexers for extracting necessary voltage from analog bus 3025 are arranged in read-out circuits 3022, and adjustment is realized by changing the voltage extracted from analog bus 3025 according to variation of sensor 3021 such that read-out circuits 3022 are not saturated despite variation in sensor 3012. A multiplexer is also arranged at the output of each read-out circuit 3022, and by successively selecting read-out circuits 3022 from which signals are sent to wiring 3025, sensor signals from all read-out circuits 3022 can be read outside the chip.

Still further, examples have been reported in which an envelope detector for measuring local leakage or I/Q mismatching is provided in the stage following a mixer, the envelope detector output is converted to a digital signal by means of an ADC, and the transmission baseband signal is intentionally altered digitally such that local leakage or I/Q mismatching is reduced (I. Vassiliou et al., A single-chip digitally calibrated 5.15-5.825-GHz 0.18-um CMOS transceiver for 802.11a wireless LAN, IEEE JSSC, Vol. 38, No. 12, 2003, pages 2221-2231).

In recent years, wideband communication has become necessary in wireless communication, and wideband communication of 54 Mbps has been put to practical use in, for example, IEEE 802.11a standards. Further, in recent years, standards have been drawn up for ultra-wideband (UWB), which is wireless communication of the 1-Gbps class in the IEEE 802.15 TG3a standards for wireless close-range communications. In wireless communication of this type, the occupied frequency bandwidth becomes extremely broad based on Shannon's law, for example, a wide bandwidth spanning 3.1 GHz to 10.6 GHz being used in UWB (for example, refer to Nikkei Electronics, Mar. 31, 2003 issue, pp. 30 to 31). Wideband wireless communication that spans three times the frequency ratio, i.e., frequencies of approximately three times the minimum frequency, is still unavailable.

For example, in a UWB wireless system referred to as the "multiband system," a frequency region ranging from 3.1 GHz to 10.6 GHz is divided into, for example, fourteen sub-bands #1 to #14 each corresponding to a channel, as shown in FIG. 2. Each of the fourteen sub-bands has a bandwidth of approximately 500 MHz, and the multi-band UWB wireless system is formed such that a wide bandwidth is covered by successive high-speed hopping between the sub-bands.

The documents cited in the present specification are listed below:
Patent Document 1: JP-A-2002-340853;
Patent Document 2: JP-A-H05-087936;
Patent Document 3: JP-A-H03-235293;
Patent Document 4: JP-A-H07-202961;
Patent Document 5: JP-A-2004-020325;
Non-Patent Document 1: I. Vassiliou et al., A single-chip digitally calibrated 5.15-5.825-GHz 0.18-um CMOS transceiver for 802.11a wireless LAN, IEEE JSSC, Vol. 38, No. 12, 2003, pages 2221-2231;
Non-Patent Document 2: Nikkei Electronics, Mar. 31, 2003 issue, pp. 30-31.

DISCLOSURE OF THE INVENTION

Problem to be Solved by the Invention

Necessary conditions that can be considered for a semiconductor device used in this type of ultra-wide band wireless close-range transceiver include the provision of a low-power characteristic suitable for use with a battery in a portable apparatus, an ultra-high-frequency characteristic as represented by a frequency such as 10.6 GHz, an ultra-wide band characteristic as represented by 500 MHz, as well as a low price suitable for consumer appliances. In other words, the chip area of a semiconductor device that makes up this type of transceiver must be made compact, and the use of microprocessing technology nodes is to be preferred. For example, in a semiconductor device realized by processing of the 90-nm technology node class, the cut-off frequency of transistors included in the semiconductor device reaches close to 200 GHz and such a semiconductor device is therefore suitable for use at this ultra-high frequency. In addition, the scaling that accompanies miniaturization of design rules enables a major decrease of power consumption in digital circuits.

In recent years, ad hoc sensor networks are being investigated in which a far-range sensor network can be constructed by both mounting circuits for realizing wireless communication functions on semiconductor chips and mounting sensors and actuators, and then, despite the shortness of the communication distance between a pair of semiconductor chips, carrying out inter-chip communication while repeatedly relaying. When considering applicability to this type of ad hoc sensor network, semiconductor chips in this type of network must have autonomous intelligence and lower power consumption, and further, a high-frequency characteristic for communication functions, and the use of a miniaturized process nodes is to be desired.

On the other hand, when miniaturized process nodes are used, problems are encountered such as the magnification of variations in semiconductor devices that have been fabricated through this type of process node and the lowering of the power source voltage. For example, for a 90-nm process node, the standard deviation of the variation in threshold voltage (Vt) in the surface of fabricated semiconductor chips is approximately 1.5 times that of a case in which a 130-nm process node is used. In a semiconductor device realized by a 90-nm node, the power supply voltage is on the order of 1 to 1.2 V and the number of cascade levels of transistors is limited to the order of 2 or 3; and the construction of a high-precision correction circuit is therefore problematic.

In a semiconductor device, overhead such as power consumption and surface area that is devoted to correction is preferably made as low as possible. The correction circuit must avoid influencing the ultra-high frequency characteristic. Typically, increasing the size of elements is a simple solution for reducing inter-element variation, but this solution tends to increase parasitic capacitance and degrade the high-frequency characteristic of the semiconductor device. In the realm of ultra-high frequencies such as 10 GHz, the high-frequency characteristic of the overall circuit is greatly degraded each time an extra transistor is connected to a gate.

Allowing this inter-element variation to occur causes various problems such as: saturation of amplifiers resulting from increase of the dc offset of the amplifier, deviation from the spectral mask resulting from increase in local leakage, increase in interference from other wireless systems resulting from increase in spurious components, increase in noise resulting from the in-band influx and superposition of noise such as thermal noise, and increase in the effect of second order distortion, i.e., the generation of sensitivity to a frequency component that is twice the local frequency.

In particular, when the power supply voltage is on the order of 1 V, the dynamic range of the circuit is already extremely narrow, and the introduction of a large dc offset therefore may present enormous problems. In addition, in ultra-wide bandwidth wireless such as UWB in which the frequency bandwidth is approximately three times the frequency ratio, frequencies of twice the local frequency enter in-band in many cases. In addition, the wide channels prevent the adoption of strategies used in narrow bandwidth wireless such as inserting filters to avoid spurious components, and the problems of second order distortion and spurious components are therefore exacerbated. The power density per frequency (dBm/MHz) of a desired wave is decreased due to implementation of wide bandwidth baseband spreading on the order of 500 MHz decreases, and this increases the danger that carrier leakage such as local leakage will exceed the spectral mask.

In SoC on which are mounted wired/wireless communication circuits, sensors, actuators, control circuit, and CPUs, a single system is made up from different circuits, i.e., hetero circuits; and when the system does not operate due to variations, difficulties are encountered in ascertaining the circuit blocks of the system in which problems have occurred, and further, the degree of these problems. As an exception, the configurations shown FIG. 1B and FIG. 1D in which a plurality of identical sensors or read-out circuits are arrayed are of a configuration in which the plurality of sensor outputs or read-out circuit outputs are collected and each sensor output or read-out circuit output is successively selected, whereby the amount of variation in the offset of a sensor or read-out circuit can be read at the same time the signal is read and with a small overhead.

However, in a hetero circuit in which a low-noise amplifier (LNA), demodulator (also called "down converter"), low-pass filter (LPF), variable-gain amplifier (VGA), and synthesizer are connected in a series, as in a wireless receiver, the amount of variation of each part cannot be read out as is. Further, the impairment produced by the variation may be, for example, second order distortion or I/Q mismatching in a demodulator, may be input offset in a low-pass filter or VGA, or may be a spurious component in a synthesizer. In a modulator (also called an "up converter") on the transmission side, impairment may be local leakage.

A configuration for collecting, and further, correcting the amount of impairment in this type of hetero circuit with low power, area, and parasitic capacitance overhead does not exist in the background art.

It is the chief object of the present invention to provide a semiconductor device that measures the amount of variation and corrects variation, and further, that has small overhead for power consumption, area, and parasitic capacitance (speed or high-frequency characteristics).

Means for Solving the Problem

The first semiconductor device of the present invention is a semiconductor device which has a plurality of circuit blocks and includes: a detector arranged in each of the circuit blocks for detecting an electrical signal of an element of that circuit block; wiring through which output of each detector passes; a plurality of switches for sending output of each detector to the wiring; and a buffer that is connected to the wiring and through which dc voltage passes.

More specifically, this type of semiconductor device is provided with: for example, a monitor bus arranged to cross each block for the purpose of monitoring a variation signal such as dc offset that accompanies element variation in each circuit block; a detector provided in each block for extracting the variation signal; switches for dispatching variation signals to the bus; and an integration circuit connected to the monitor bus.

Preferably, this semiconductor device further includes: a multilevel voltage generator for generating a plurality of dc voltages; a multilevel voltage bus for distributing this plurality of dc voltages within a chip; and a plurality of switches for selecting a dc voltage from among this plurality of dc voltages and supplying the dc voltage to the corresponding circuit block as a correction signal. The plurality of dc voltages are divided into, for example, a coarse-adjustment voltage group and a fine-adjustment voltage group. In this case, the center of the voltage range of the coarse-adjustment voltage group may substantially match the center of the voltage range of the fine-adjustment voltage group.

In the present invention, a correction signal is preferably supplied to the back gate of a transistor in a circuit block, and the back gate voltage may then be changed in accordance with the correction signal. In order to implement high-speed variation correction, a control means is preferably provided for uniquely determining the correction voltage $\Delta V$ based on the correlation between the back gate correction voltage $\Delta V$ and the variation signal. In addition, in order to realize highly accurate variation correction even when the correlation between the back gate correction voltage $\Delta V$ and the variation signal is complicated, the setting of the correction signal and the acquisition of the electrical signal may be alternately repeated such that the detector output reaches a stipulated value, and an optimum correction signal may be searched such that the electrical signal falls within a prescribed range.

In the present invention, a voltage monitor circuit and/or a temperature monitor circuit connected to wiring by way of switches may be further provided at one point or a plurality of points in the semiconductor device.

The second semiconductor device of the present invention is provided with: a tail transistor for determining a bias current; a differential transistor pair connected to said tail transistor for modulating the bias current; and a load through which the modulated bias current flows; wherein a correction signal is supplied to a back gate of the differential transistor pair. The use of a semiconductor device of this type in a mixer enables an alleviation of the problem of local leakage of a direct up-converter and the problem that a direct down-converter has sensitivity to twice the local frequency.

The third semiconductor device of the present invention is provided with: a tail transistor for determining a bias current; a differential transistor pair connected to the tail transistor for modulating the bias current; and a load through which the modulated bias current flows, wherein a correction signal is supplied to a back gate of the tail transistor.

In the present invention, the use of wiring such as a monitor bus or analog correction bus in exemplary embodiments to be described enables correction of impairment while realizing an extreme reduction of overhead in the power consumption, area, and parasitic capacitance. The use of this type of wiring enables monitoring and correction of impairment of any internal circuit block, even in hetero circuits that have random signal paths. The application of the present invention enables an alleviation of the problem that a mixer has sensitivity to twice the local frequency, which is particularly problematic in UWB.

In the present invention, the provision of a control means for uniquely determining one correction voltage $\Delta V$ in accordance with the correlation between the back gate correction voltage $\Delta V$ and the amount of offset enables correction at high speed. In addition, the performance of a search such that the detector output reaches a stipulated value enables accommodation of circuits having complicated input/output characteristics.

When a voltage monitor circuit and/or temperature monitor circuit is provide at one or various locations in a semiconductor device, data are collected by way of the wiring (for example, a monitor bus) to enable correction of the influence of the power-supply voltage dependence or temperature dependence of each circuit block. Still further, only one integration circuit for correction may be provided on a semiconductor device (chip), and the influence of the variation of the measurement circuit can be eliminated by providing the capability to eliminate the offset of this integration circuit.

In the present invention, the provision of a back gate control terminal in a Gilbert cell enables implementation of correction without influencing the original characteristics of the Gilbert cell.

BRIEF DESCRIPTION OF THE DRAWINGS

FIG. 18 is a view for explaining the operation of the analog bus correction in the first exemplary embodiment;

FIG. 34 is a block diagram showing an example of the configuration of a multiband generator used in the present invention;

FIG. 35A is a circuit diagram showing an example of a filter and amplifier used in the present invention;

FIG. 35B is a circuit diagram showing another example of a filter and amplifier used in the present invention;

FIG. 35C is a circuit diagram showing another example of a filter and amplifier used in the present invention;

EXPLANATION OF REFERENCE NUMERALS

101 LNA (Low-Noise Amplifier);
102 Demodulator;
103 Reception part LPF (Low-Pass Filter);
104 Reception part VGA (Variable-Gain Amplifier);
105, 106 Tail switch;
107 Detector;
108 Detector switch;
109 Monitor bus;
110 Integrator;
111 Multilevel voltage generator;
112 Analog bus;
113 Register;
114 Multiplexer;
115 Analog bus double-balanced mixer;
116 Analog bus LPF;
117 Analog bus VGA;
118 Power-supply voltage monitor circuit;
119 Temperature monitor circuit;

121 PLL;
122 Synthesizer low-frequency unit;
123 Synthesizer high-frequency unit;
124 Transmission part VGA;
125 Transistor;
126 Transmission part LPF; and
127 Power amplifier.

BEST MODE FOR CARRYING OUT THE INVENTION

Explanation next regards preferable exemplary embodiments of the present invention with reference to the accompanying drawing.

First Exemplary Embodiment

Figure 3:
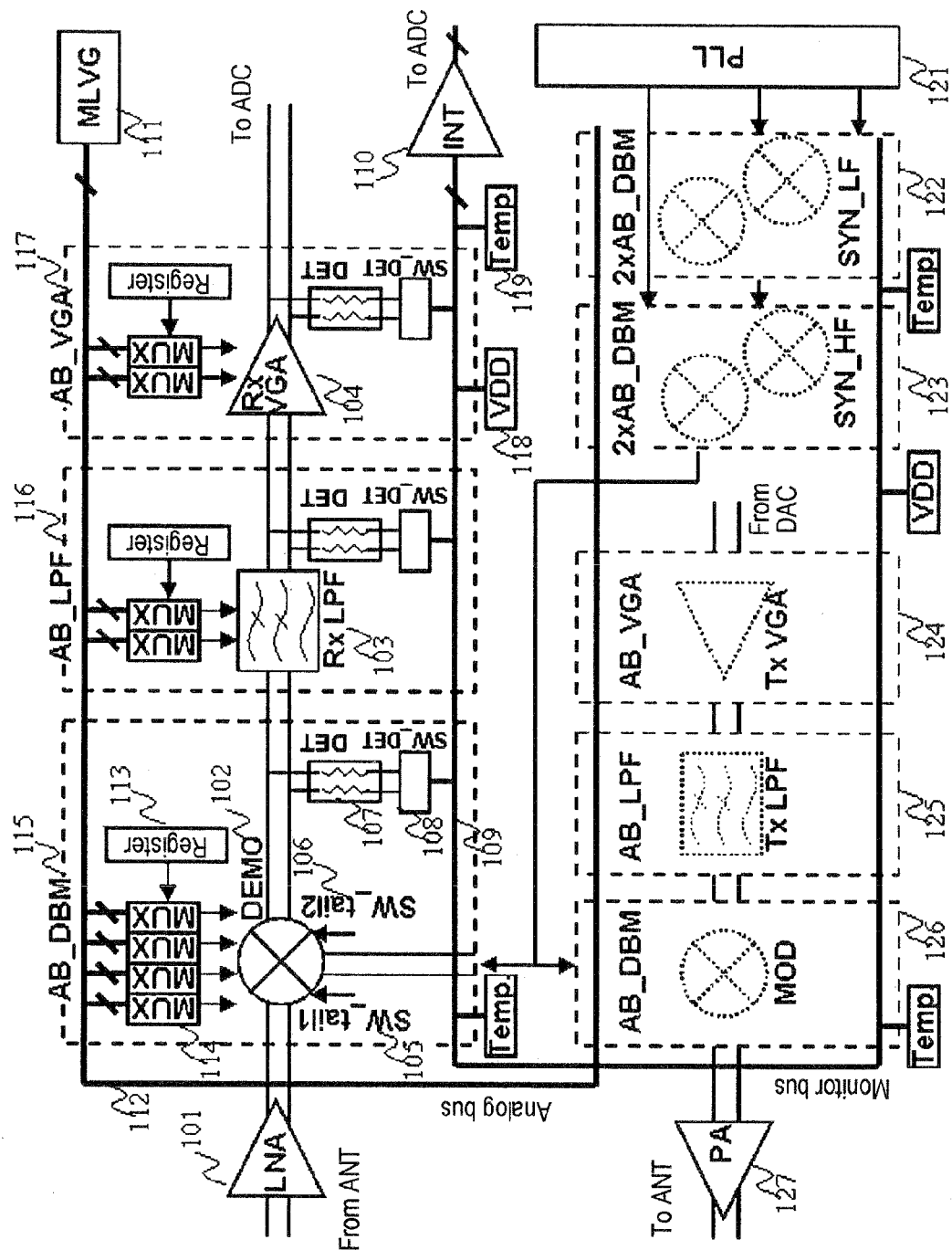
FIG. 3 is a block diagram showing the configuration of a direct conversion transceiver that is a semiconductor device according to the first exemplary embodiment of the present invention.

FIG. 3 is a block diagram of a direct-conversion transceiver, which is a semiconductor device according to the first exemplary embodiment of the present invention. This transceiver is provided with: low-noise amplifier (LNA) 101, demodulator (DEMO) 102, low-pass filter (LPF) 103, and variable gain amplifier (VGA) 104 as the path of received signals; and VGA 124, LPF 125, modulator (MOD) 126, and power amplifier (PA) 127 as the path of transmitted signals. To distinguish the reception path and transmission path, "Rx" is appended to the names of constituent elements provided on the reception path, and "Tx" is appended to the names of constituent elements provided on the transmission path. LNA 101 and PA 127 are connected to an antenna (ANT) (not shown). Phase-locked loop (PLL) 121, low-frequency unit (SYN_LF) 122, and high-frequency unit (SYN_HF) 123 are provided as the elements that make up a synthesizer for generating local signals.

In this transceiver, tail switch (SW_tail1) 105, tail switch (SW_tail2) 106, detector (DET) 107, detection unit switch (SW_DET) 108, monitor bus 109, and integration circuit (INT) 110 are provided as elements that make up a monitor bus for monitoring variation. Multilevel voltage generator (MLVG) 111, analog bus 112, multiplexer (MUX) 114 and register 113 are provided as elements that make up an analog correction bus. In addition, power-supply voltage monitor circuit (VDD) 118 and temperature monitor circuit (Temp.) 119 are provided in the transceiver according to requirements such as demanded accuracy.

The following explanation regards the operation of each of the parts shown in FIG. 3, which assumes the application of the present invention to a UWB wireless transceiver of the multiband OFDM (MB-OFDM) system. Received signals of 3 GHz to 10 GHz that are introduced from the antenna (ANT) are amplified by several tens of dB by wideband LNA 101 and then applied as input to demodulator 102. In this case, demodulator 102 is of a "direct down conversion" configuration, and local signals of 3 GHz to 10 GHz are supplied from a synthesizer to the local port of this demodulator. When 3.4 GHz, which is the channel frequency of channel #1 that is the channel having the lowest frequency, is supplied as the local signal, the signal of channel #1 that enters from the antenna is converted by demodulator 102 to a baseband signal from the vicinity of DC to approximately 250 MHz. Filter 103 passes the signal of the passband from the vicinity of DC to approximately 250 MHz and attenuates the signal of the stop band on the high-frequency side of approximately 250 MHz. VGA 104 is capable of changing its gain from the vicinity of 0 dB to several tens of dB, and amplifies the signal to the optimum level for an ADC (analog-to-digital converter, not shown) that is connected in a subsequent stage.

Figure 1A:
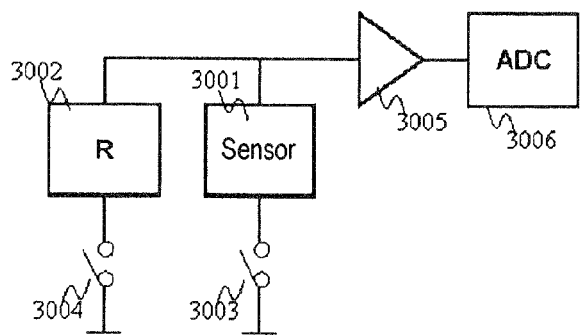
FIG. 1A is a block diagram for explaining an example of a circuit for variation correction of the background art.
Figure 1B:
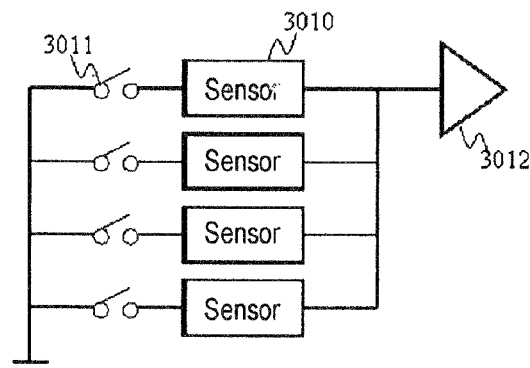
FIG. 1B is a block diagram for explaining an example of a circuit for variation correction of the background art.
Figure 1C:
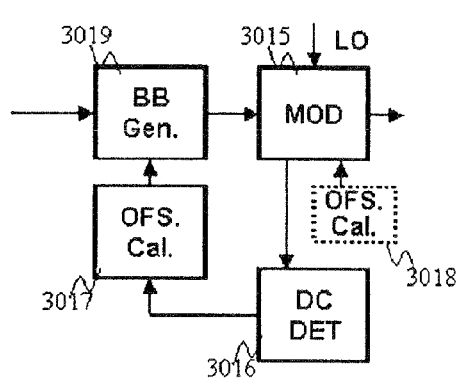
FIG. 1C is a block diagram for explaining an example of a circuit for variation correction of the background art.
Figure 1D:
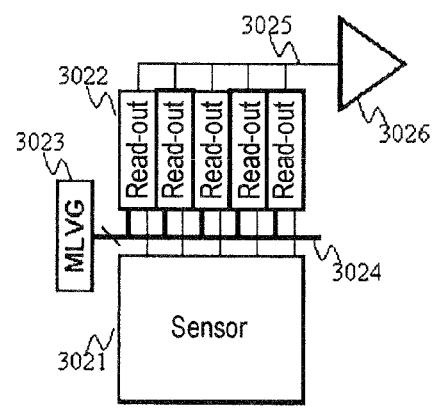
FIG. 1D is a block diagram for explaining an example of a circuit for variation correction of the background art.
Figure 2:
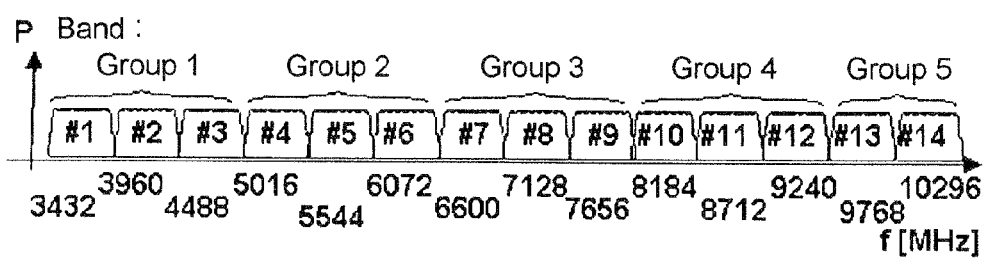
FIG. 2 is a view showing the band arrangement of MB-OFDM.

Various radio waves enter antenna other than the radio wave of channel #1. Normally, when a single piconet is formed, a master that serves as a coordinator and several slaves located within approximately 10 m of the master exist within the piconet. As shown in FIG. 2, in MB-OFDM system, a particular hopping sequence that uses, for example, channels #1 to #3 of group #1 is assigned to one piconet. A different hopping sequence of the same frequencies of group #1 is assigned to another slightly separated piconet. Accordingly, radio waves in another piconet that is not coordinated are mixed in a reception antenna. These waves are the adjacent channel #2, channel #3 that is adjacent to channel #2, or even more greatly separated channels #7 or #8. Signals of an adjacent channel such as channel #2 or a sub-adjacent channel such as channel #3 are normally attenuated by LPF 116. The problem is that, when radio waves come from channel #7 or channel #8, which are channels with frequencies approximately twice that of channel #1, the occurrence of impairment in the demodulator causes the signal of channel #7 or channel #8 to be down-converted to the baseband. When a signal from channel #7 or channel #8 falls within the baseband, a portion is generated that cannot be removed by the LPF.

This impairment arises from the second order distortion of the mixer, and is generated due to, for example, the occurrence of Vt (threshold voltage) variation or gm (mutual conductance) variation in the differential transistor pair (differential pair) of a double-balanced mixer (DBM). Normally, the second order distortion of a double-balanced mixer is cancelled if the differential pair is ideal, but a mixer tends to have sensitivity to second order distortion due to this type of element variation.

The second order distortion of a demodulator is normally found by applying radio waves of twice the local frequency as input to the demodulator and then finding the conversion gain for twice the local frequency from the amount that is down-converted to the baseband at that time. In the case of an element that is corrected only once at the time of shipment and subsequently not changed, a structure for measuring this type of second order distortion need not be incorporated, but the element variation of such elements normally changes with temperature (or with the passage of time) and therefore cannot be eliminated by only one correction, and corrections must therefore be implemented again according to necessity, for example, in the event of temperature changes.

Detector 107 arranged in the demodulator section measures the impairment of the demodulator. The measurement results are sent to monitor bus 109 by turning ON selection switch 108. Integration circuit 110 integrates the signals on the monitor bus and supplies integration results as output. The output from integration circuit 110 is supplied to an ADC by way of, for example, a switch. Regarding the ADC, if an ADC that is used for digitizing received signals is of a configuration that connects to the integration circuit during monitor operation, the provision of one ADC on the semiconductor chip will suffice. The impairment of a demodulator is thus taken into a control circuit such as a CPU or hard-wired logic.

Regarding the correction of impairment, a configuration can be adopted that uses an analog bus similar to that disclosed in JP-A-2004-020325. Multilevel voltage generator (MLVG) 111 generates, for example, a group of M pieces of dc voltages for coarse-adjustment and a group of N pieces of dc voltages for fine-adjustment. Analog bus 112 sends these M+N pieces of dc voltages to the hetero circuit blocks of each part in a semiconductor chip and thus enables the correction of variation in each circuit block. For example, applying one voltage among the dc voltages for coarse adjustment to one of the back gates of the differential pair of a double-balanced mixer and applying one voltage among the group of dc voltages for fine adjustment to the other back gate enables a maximum of M×N types of correction and can set the influence of Vt variation to 1/(M×N).

Demodulator 102 has the configuration of, for example, double-balanced mixer (DBM) 421 such as shown in FIG. 4A. DBM 421 is provided with: output ports (VoutP and VoutN) 217, 218 composed of a pair of terminals; high-frequency ports (RFP and RFN) 403, 404 composed of a pair of terminals; local ports (LOP and LON) 411, 412 composed of a pair of terminals; and tail switches (SW_tail1 and SW_tail2). In contrast to a normal double-balanced mixer, this mixer is further provided with back gate ports for correction of variation. In this example, the back gates (BGP1, BGN1, BGP2, and BGN2) 413 to 416 of each of the four transistors of the two sets of differential pairs are extracted to the back gate ports. BGP1 (413) and BGN1 (414) are the back gates of one differential pair, and, for example, applying one voltage among the dc voltages for coarse adjustment to BGP1 (413) and applying one voltage among the dc voltage for fine adjustment to BGN1 (414) enables the above-described correction. The same holds true for the set of BGP2 (415) and BGN2 (416).

Multiplexer (MUX) 114 in FIG. 3 selects and supplies the correction voltage from analog bus 112 to the four back gates of these two sets of differential pairs of a mixer. In accordance with the setting of register 113, one voltage among the coarse-adjustment dc voltages is supplied to, for example, BGP1 (413), and one voltage among the fine-adjustment dc voltage group is supplied to BGN1 (414). The set of BGP2 (415) and BGN2 (416) is similar. Register 113 is controlled from a control circuit such as a CPU or hard-wired logic that holds information on the impairment of the demodulator.

A device in which monitor circuits 105 to 109 for monitoring variation and variation correction circuits 112 to 114 have thus been added to a mixer is referred to as analog bus double-balanced mixer (AB_DBM) 115, and a similar device can also be used in a modulator or synthesizer. In the figure, the letters "AB" are added to the abbreviation for modulators or synthesizers having this type of configuration.

In addition, the arrangement of a similar configuration in the vicinity of LPF 103 enables correction of impairment such as the offset variation of the LPF. LPF 103 is a gmC filter made up by a transconductance amplifier (OTA) and a capacitor, and the back gates of the differential transistors in the OTA are extracted similar to the case of a mixer. A configuration realized by a monitor bus is used to measure the output node voltage of an LPF, or, when an LPF is made up from a plurality of OTAs, the output node voltage of an OTA somewhere in the LPF. The impairment of a filter is also generated by the Vt variation or gm variation of a differential transistor pair, and this impairment can be corrected if correction of back gates is carried out from an analog bus such that, for example, the offset of the output that is measured by the monitor bus is reduced.

The further arrangement of a similar structure in the vicinity of VGA 104 enables correction of the impairment of, for example, the offset variation of the VGA. VGA 104 is an amplifier provided with a differential transistor pair, and the back gate of each transistor of this differential pair is extracted similar to the case of a mixer. A structure realized by the monitor bus is used to measure the voltage of the output nodes of the VGA, or when the VGA is made up from a plurality of differential pairs, the voltage of the output nodes of a differential pair somewhere among the plurality of differential pairs. The impairment of the VGA is produced by, for example, Vt variation or gm variation in the differential transistor pair, and the impairment can be corrected if correction is carried out from the analog bus to the back gate such that the offset of the output measured by the monitor bus is reduced.

On the other hand, on the path of the transmission side, a baseband signal from the vicinity of DC to about 250 MHz is supplied from a digital-to-analog converter (DAC) to VGA 124, and VGA 124 amplifies the baseband signal to a desired power. The average transmission power of UWB is on the order of −10 dBm, and although a VGA does not normally require a large gain, this gain can preferably be controlled to change the transmission power. From the standpoint of power consumption, the resolution of the DAC or ADC cannot be made precise, and optimum gain adjustment is therefore necessary in a VGA. The gain is preferably within a variable range of several tens of dB centering in the vicinity of 0 dB.

The output of VGA 124 is applied to LPF 125. The transmission side LPF is chiefly for the purpose of removing the aliasing of the DAC, and the passband frequency is determined according to the sampling frequency of the DAC. The order of LPF 125 and VGA 124 can be exchanged. The output of LPF 125 is connected to modulator 126. The modulator converts a baseband signal from the vicinity of DC to the vicinity of 250 MHz to a RF signal in the vicinity of 3 GHz to 10 GHz. A local signal from synthesizer 123 is applied to the local port of modulator 126. Power amplifier (PA) 127 amplifies the modulator output. The gain of the power amplifier also depends on the conversion gain of the modulator, but must be from several dB to several tens of dB.

VGA 124, LPF 125, or modulator 126 is also provided with a construction for monitoring impairment and a construction for correcting this impairment similar to the constructions described for the reception-side blocks. The necessity for correction in VGA 124 and LPF 125 varies with the gain of these blocks, but when there is gain of several tens of dB, and in particular, at a low power-supply voltage on the order of 1 V, correcting the offset voltage becomes important for preventing suppression of the dynamic range of a signal.

Local leakage is one form of impairment of modulator 126. The local leakage of a modulator is also produced by Vt or gm mismatching between the two transistors of the differential pair that forms part of a mixer. A correlation exists between the amount of local leakage and the DC offset in the mixer output, and the amount of local leakage can thus be grasped by monitoring the DC offset. As with the case of a demodulator, in this exemplary embodiment, a dc voltage monitoring capability is provided at the output ports of a double-balanced mixer (DBM) and the amount of offset of the dc voltage is then taken into a control circuit. The control circuit works on a register in modulator 126 to operate a multiplexer, and one dc voltage is taken from each of a coarse-adjustment dc voltage group and a fine-adjustment dc voltage group and supplied to each of the back gates of a differential transistor pair.

Power-supply voltage monitor circuit 118 monitors the power supply voltage and bias voltage of each part of a semiconductor chip. Normally, in the process node that has been subjected to miniaturization of the design rule of a 90-nm class, the power supply voltage supplied to the chip from the outside is 3.3 V, 2.4 V, or 1.8 V; and the power supply voltage of 1 to 1.2V that is used to operate circuits of the core portion is usually generated by a regulator circuit on the chip. There is a limit to the improvement of the temperature stability of the output voltage of the regulator, and further, there is a limit to the reduction of the IR (current-resistance product) drop in the power supply wiring. The power-supply voltage in each circuit block is influenced by temperature fluctuation and load fluctuation. There is also a circuit topology that is influenced by changes in power supply voltage, and changes in power supply voltage are preferably detected and reflected in correction. For example, the relation between the power-supply voltage and the amount of local leakage or offset voltage is measured in advance and recorded in a table, and upon detecting a change in the power-supply voltage that is sufficient to necessitate re-adjustment, the table can be consulted according to this amount of change and this change then reflected in the correction.

Temperature monitor circuit 119 monitors the temperature of each part on a semiconductor chip. Circuits that are particular sensitive to temperature changes occur according to circuit blocks. Even when impairment has been once corrected, subsequent temperature changes may, depending on the circuit, cause the amount of correction to shift from the optimum value and thus necessitate re-adjustment. For example, the local leakage of a modulator is produced by mismatching of the threshold voltage Vt or the mutual conductance gm in the differential pair of a Gilbert cell. These parameters have temperature dependence, and thus, even when the influence of these parameters can be canceled by implementing correction one time, the amount of correction may shift from the optimum value when the temperature changes. In some cases, only one temperature monitor circuit need be provided on a chip, but there are cases in which the state of distribution of heat sources on a chip or the state of distribution of heat resistance of the chip and the outside that arises from the mounted state of the chip cause large temperature differences on the chip, and moreover, cases in which these temperature differences change over time; and in such cases, temperature monitor circuits are preferably placed at various locations on a semiconductor chip. As in the case of a voltage monitor, for example, the relation between the chip temperature or the temperature of each circuit block and the amount of local leakage or the offset voltage can be measured in advance and recorded in a table, and upon detection of a change in temperature sufficient to necessitate re-adjustment, the table can be consulted according to this amount of change and correction carried out that reflects this amount of change.

Figure 5:
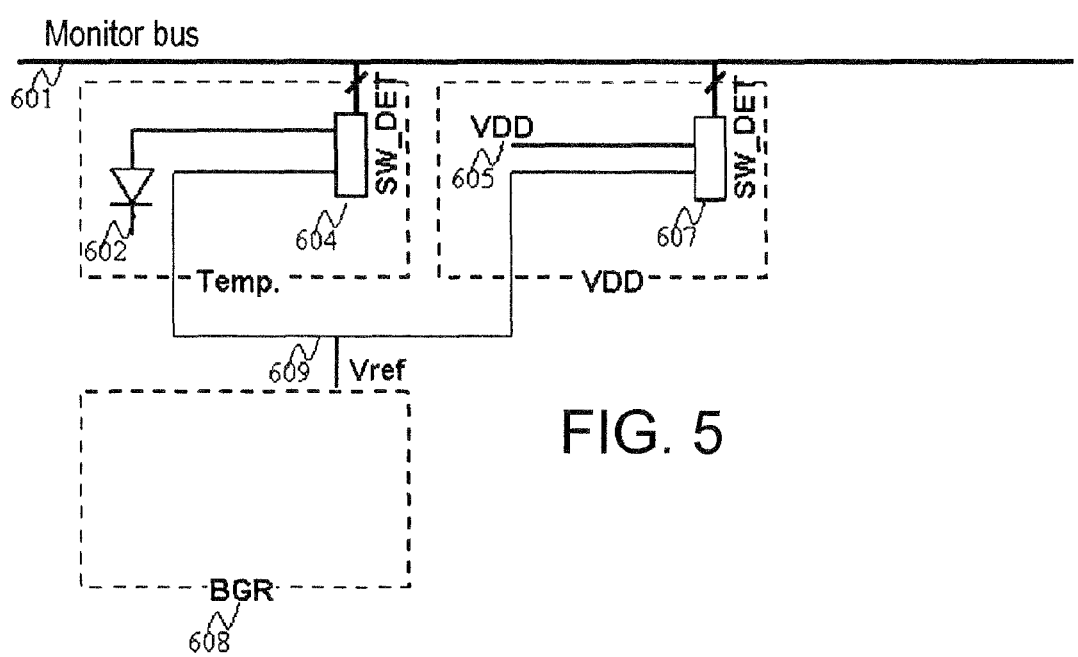
FIG. 5 is a circuit diagram showing an example of the temperature monitor circuit and power supply voltage monitor circuit in the first exemplary embodiment.

FIG. 5 is a circuit diagram showing an example of a temperature monitor circuit and voltage monitor circuit in the present exemplary embodiment. Band-gap reference (BGR: band-gap reference voltage generation circuit) 608 for generating reference voltage Vref is provided, and reference voltage (Vref) 609 is supplied to temperature monitor circuit (Temp.) and voltage monitor circuit (VDD). The temperature monitor circuit is provided with: diode 602 for measuring temperature; and detection unit switch (SW_DET) 604 for switching diode 602 and reference voltage Vref to connect to monitor bus 601. The voltage monitor circuit is provided with detection unit switch (SW_DET) 607 for switching power-supply voltage (VDD) 605 and reference voltage Vref to connect to monitor bus 601.

In the configuration of the monitor bus of the present exemplary embodiment, the impairment of a demodulator, modulator, amplifier, filter, or oscillator such as described in the foregoing explanation is collected by a bus, this impairment component next amplified while implementing band-limitation by means of an integration circuit that is provided on the semiconductor chip, and this impairment component then converted to a digital value by means of an ADC, whereby the impairment can be ascertained by a control circuit. In a configuration of this type, the signal transmission inherent to these circuit blocks is almost completely unaffected. For example, a demodulator down-converts an RF signal to a baseband signal, but in the present exemplary embodiment, impairment can be measured with almost no affect upon the conversion gain or noise factor (NF) or IP3 (third order intercept point) which is an index of linearity. This point is one major feature of the present invention, which uses a path for measuring impairment that is different from the original signal path.

The configuration for measuring impairment in the present exemplary embodiment does not limit the target of measurement to circuits of the same type and can be applied to the measurement of impairment of various types of circuit blocks, such as mixers, amplifiers, filters, oscillators, temperature sensors, voltage monitors, ADCs, and DACs. The configuration of the present exemplary embodiment can be applied to impairment in a digital circuit, such as the skew variation, speed variation, variation in drive capabilities, and threshold variations of two buffers. A configuration that can be applied to the measurement of impairment of these hetero circuit blocks that exist on a single semiconductor chip did not exist in the background art.

Typically, the flow of signals between various circuit blocks in hetero circuits is not regular, and in addition, the connection relations of signals are not simply of serial form or parallel form. For example, a received RF signal flows from an LNA to a demodulator and LPF while a local signal is supplied from a synthesizer to the local port of the demodulator. The configuration of a monitor bus according to the present exemplary embodiment can measure impairment of each circuit block under these connection relations. A mixer that is present in the synthesizer generates a spurious component due to its impairment, but the amount of impairment of the mixer cannot be ascertained by simply observing the baseband signal that passes through each circuit block of a receiver. The configuration according to the present exemplary embodiment that can directly access each circuit block can first ascertain the impairment inside the system. In UWB, because signals of frequencies of an ultra-wide band must undergo high-speed hopping in intervals of several nanoseconds, a synthesizer that uses an SSB (Single Side-Band) mixer must be employed, and the impairment of the mixer tends to produce a spurious component. In a synthesizer for normal narrow-band communication, the synthesizer configuration uses a PLL of an Integer-N or Fractional-N type, and no attention was given to the problem regarding the production of this type of spurious component in the background art.

The configuration for correction by means of an analog bus in the present exemplary embodiment has a high degree of freedom, similar to the monitor bus. The use of a configuration realized by an analog bus that is independent of the original signal path enables correction to be carried out without influencing the original signal transmission in each circuit block in hetero circuits. The present exemplary embodiment enables measurement of the impairment of any circuit block among hetero circuits by means of a monitor bus, and because the control circuit is able to ascertain this impairment, the impairment of any circuit can be corrected using the analog bus based on these measurement results. The combination of a monitor bus structure and an analog bus structure that can both access any circuit block thus enables the correction of impairment in hetero circuits that was not even recognized as a problem in the background art.

The features of measurement and correction of impairment according to the present invention can be implemented with extremely low power consumption, in-chip area, parasitic capacitance, and overhead; and in addition, correction can be carried out with high accuracy even at low voltage. Due to the low level of parasitic capacitance, speed or high-frequency characteristics are not sacrificed. In the monitor bus, the circuits that are to be arranged in each circuit block are basically detectors and switches. When resistors are used as the detectors, virtually no current flows constantly in the monitor bus. Current flows to detectors only during the integration interval in the one integration circuit that is provided on the target semiconductor chip. When the integration interval ends, the bias current of the integration circuit may be cut off, whereby current no longer flows to the detectors. In the analog bus as well, the components arranged in each circuit block are basically only multiplexers and registers, and current does not constantly flow to these circuits. Current flows only to the one multilevel voltage generator that is provided in the target semiconductor chip.

The area shown on the chip by the detectors and switches that are added for measurement and the multiplexers and registers that are added for correction is next examined. In particular, assuming a case of using semiconductor processing of the 90-nm rule or the like, a detector composed of two resistors can be formed in an area several micrometers square and a switch pair can be formed in an area approximately 10 μm square. A multiplexer and register for selecting two voltages from nine voltages can be formed in an area of 10 μm by several tens of micrometers. When an analog bus composed of eight lines is provided on a chip, a width on the order of 16 μm is sufficient if a line-and-space of 1-μm is used. Compared to a case in which a DAC is arranged in each circuit block for correction, the method of the present exemplary embodiment enables an extreme reduction of the chip area and power consumption required for correction.

Further, the configuration realized by the analog bus of the present exemplary embodiment is a configuration in which a group of voltages generated by a resistor ladder are switched by switches for application to the back gate of a transistor, and the offset variation of active elements such as an OTA ((operational) transconductance amplifier) or operational amplifier therefore is not introduced. A configuration in which a component such as a DAC is arranged in each circuit block suffers from the problem that the offset inherent to the circuits for correction themselves further exacerbates the variation and widens the range of variation correction. In the present exemplary embodiment, the monitor bus is also basically made up from detector resistors and switches, and as will be explained hereinbelow, providing the one integration circuit that is provided on the target chip with a means for eliminating the offset of that integration circuit can prevent the variation of the measurement system from influencing measurement.

Typically, most RF circuits or analog circuits are provided with a differential pair or pseudo-differential pair. These components are provided because a differential construction such as a differential pair or pseudo-differential pair is resistant to crosstalk through a substrate, crosstalk between wiring, and particularly, the inductive cross-coupling of, for example, an inductor and the vibration or noise of power supply lines. The present invention, which implements correction by controlling the back gates of the transistors that make up differential pairs or pseudo-differential pairs, can be widely applied to RF and analog circuits. Another reason for the wide use of differential pairs or pseudo-differential pairs is that, with the trend to lower voltages, this type of differential construction or pseudo-differential construction can realize +6 dB wider linearity at the same node amplitude than a single construction that does not adopt this type of differential construction.

FIG. 3 shows a construction in which both a received signal path and transmission signal path have only one of an in-phase (I) component and quadrature (Q) component, but the variation correction technique of the present exemplary embodiment can be applied to both I/Q constructions, and further, can be applied to a more complicated system such as MIMO with almost no adverse affect on overhead.

Details of Working Examples of the First Exemplary Embodiment

Explanation next regards the details of working examples of the first exemplary embodiment.

Figure 6:
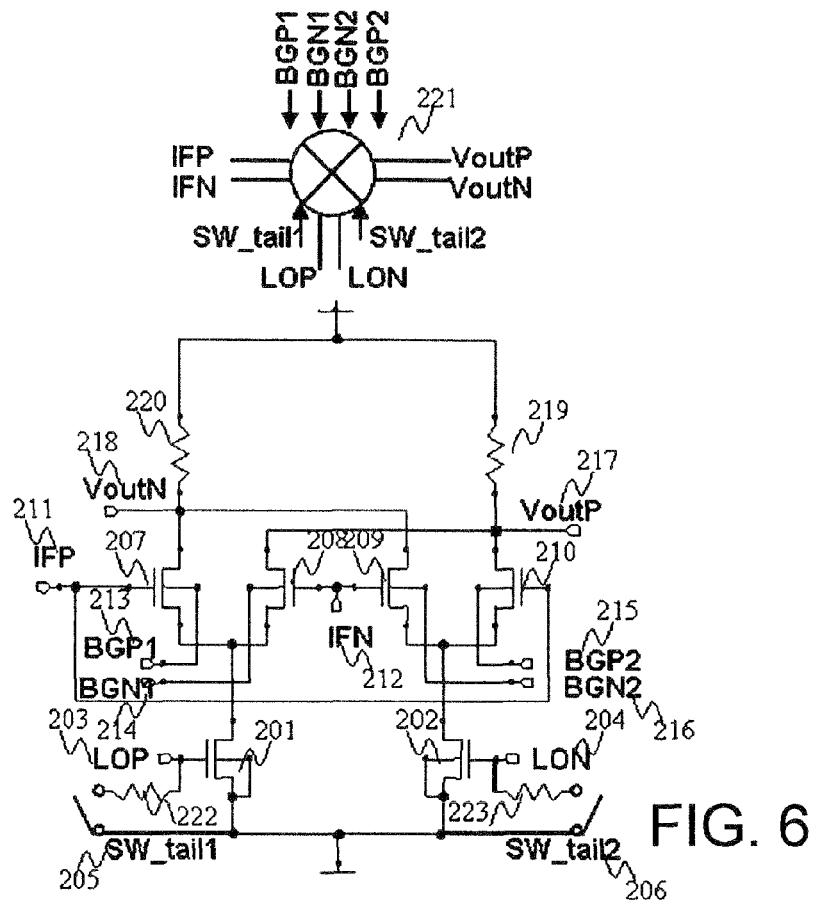
FIG. 6 is a circuit diagram showing an example of the configuration of a modulator in the first exemplary embodiment.

FIG. 6 shows an example of the configuration of a modulator in the first exemplary embodiment. Modulator 221 is provided with: IF ports (IFP and IFN) 211, 212 to which baseband signals or intermediate frequency (IF) signals are supplied; local ports (LOP and LON) 203, 204 to which local signals are supplied; output ports (VoutP and VoutN) 217, 218; and further, back gate ports 213 to 216 for variation correction. The local signals are applied as input to the gates of tail-section differential pairs 201, 202, and the baseband signals (or IF signals) are applied as input to the gates of middle-stage differential pairs 207 to 210. Load resistance 219, 220 and output ports 217, 218 are connected to the drains of the middle-stage differential pairs. Tail switches (SW_tail1 and SW_tail2) 205, 206 are connected by way of resistance 222, 223 to the gates of the tail-section differential pairs.

Regarding the operation of this circuit, local signals applied as input to local ports 203, 204 are multiplied with baseband signals or IF signals applied as input to IF ports 211, 212 and then supplied to output ports 217, 218. In a demodulator, local signals are normally supplied to middle-stage transistors 207 to 210 and baseband signals or IF signals are supplied to tail transistors 201, 202, but in the demodulator shown in FIG. 6, local signals are supplied to the tail transistors. This configuration improves the isolation between local ports and output ports and lowers the amount of local leakage before carrying out correction. The reduction of a certain amount of local leakage before correction is effective for ensuring that the range of correction is not excessive. In addition, the circuit of FIG. 6 differs from a normal demodulator in that switches for observing impairment and back gate ports for variation correction are provided.

In the observation of impairment, the DC levels of output ports 217, 218 are detected by detector 107. In the measurement of impairment between differential pair 207, 208, switch 205 is turned OFF such that bias voltage is applied as appropriate to tail transistor 201, and moreover, switch 206 is turned ON such that bias voltage is not applied to tail transistor 202. In this way, a prescribed bias current determined by the tail circuit flows to differential pair 207, 208, while the bias current does not flow to differential pair 209, 210, and as a result, only DC offset that arises from the impairment of differential pair 207, 208 appears in the output. The bias current is modulated by the gate signal of the tail transistor, and in this case, by the local signal. Differential pair 209, 210 further, by means of the signal applied to the gates, in this case, the baseband signal, modulate the bias current that is superposed with the local signal, and multiplies the baseband signal with the local signal. The above-described switch settings are reversed to measure DC offset for the purpose of similarly measuring the impairment of differential pair 209, 210.

The impairment here described includes various factors such as: between transistors, variation between the threshold voltages Vt, variation in mutual conductance gm, variation in ON current Ion, and variation in gate width or gate length; between pairs in differential pair circuits, variations in the lengths or widths of wiring; and the distances of positional relations of wiring that accompanies mask layout. In a broad sense, element variation (impairment) is defined to include variation relating to factors relating to circuit characteristics such as wiring or layout as well as to variations that arise in elements such as transistors. The impairment of these elements produces impairment of circuits such as DC offset or local leakage in the output, i.e., variation in electrical signals (variation signals). In the present exemplary embodiment, impairment is corrected by monitoring electrical signals that arise from this impairment on the element level or circuit level. On the other hand, impairment does not always appear as DC offset of output. The present invention therefore shows constructions for detecting local leakage and methods for measuring impairment that cannot be estimated from DC offset at the time of initial evaluations or at shipping, as will be described hereinbelow.

Relating to the correction of variation, variation between differential transistors 207, 208, and further, between differential transistors 209, 210 can be corrected by extracting back gate ports 213 to 216 from four middle-stage transistors. For example, taking one voltage from among the coarse-adjustment voltage group of the analog bus and conferring this voltage to back gate port BGP1 (213), and taking one voltage from among the fine-adjustment voltage group and conferring this voltage to BGN1 (214) enables the substantial elimination of the DC offset of the output, i.e., enables the substantial elimination of the impairment of the differential pair.

Figure 7A:
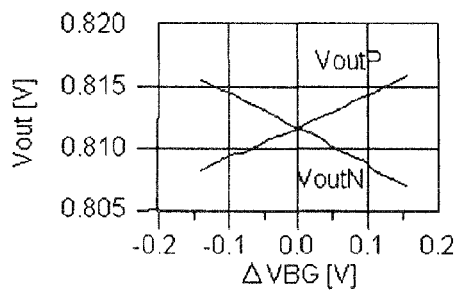
FIG. 7A is a graph showing an example of the relation between local leakage and offset.
Figure 7B:
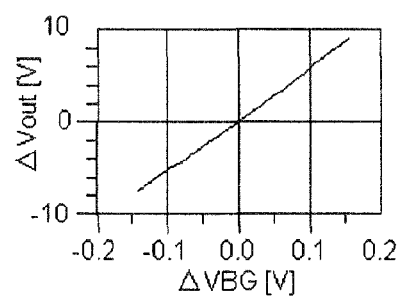
FIG. 7B is a graph showing an example of the relation between local leakage and offset.

FIG. 7A shows the change in the DC level of outputs (VoutP and VoutN) 217, 218 upon change of the voltage difference of the back gates in the differential pair, for example, the voltage ΔVBG of the difference between the voltage of BGP1 (213) and the voltage of BGN1 (214). FIG. 7B shows the relation between the DC offset ΔVout, which is the difference between VoutP and VoutN, and the above-described ΔVBG. In this case, the DC offset is 0 V when ΔVBG is 0V, but normally, the occurrence of impairment prevents the DC offset from becoming zero even when ΔVBG is 0 V, and the DC offset becomes zero when ΔVBG is at a value that diverges somewhat from 0 V. ΔVBG is basically corrected such that the DC offset becomes zero.

Figure 7C:
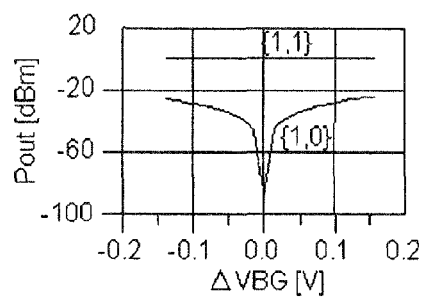
FIG. 7C is a graph showing an example of the relation between local leakage and offset.

FIG. 7C shows the relation between ΔVBG and the power of each of fundamental wave {1,1} and local leakage {1,0} in the demodulator output. The power of the fundamental wave represents the power of the signal component at the frequency that is the sum of the frequency of the signal applied as input to the RF port and the frequency of the signal applied as input to the IF port. In this case, when ΔVBG is zero, the local leakage becomes a minimum value, becoming approximately −85 dBm, and the difference between the local leakage and the fundamental wave is thus on the order of −85 dBc. Normally, impairment occurs in the differential pair, and the local leakage therefore reaches a minimum not when ΔVBG becomes zero, but when ΔVBG diverges somewhat from zero. Moving the actual differential voltage ΔVBG between the back gate voltages to the location of ΔVBG when this local leakage reaches a minimum is the purpose of variation correction.

Figure 7D:
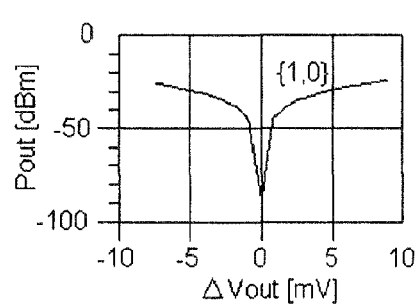
FIG. 7D is a graph showing an example of the relation between local leakage and offset.

FIG. 7D shows the relation between local leakage and the DC offset. Supposing an ideal state in which there is no impairment that arises from the layout on the semiconductor device, the local leakage is zero when the DC offset of the output is at zero. However, when impairment occurs in the layout in which, for example, either of the differential signals (LOP 203 and LON 204) on the local ports more strongly causes crosstalk with output VoutP 217, the local leakage may in some cases reach a minimum where the DC offset is at a location other than zero. In this case as well, the amount of crosstalk does not change once the layout on the chip has set, and as a result, the local leakage can be reduced by first finding in advance in, for example, an evaluation the DC offset at which the local leakage becomes a minimum, and then carrying out correction such that this DC offset is always achieved.

Figure 8:
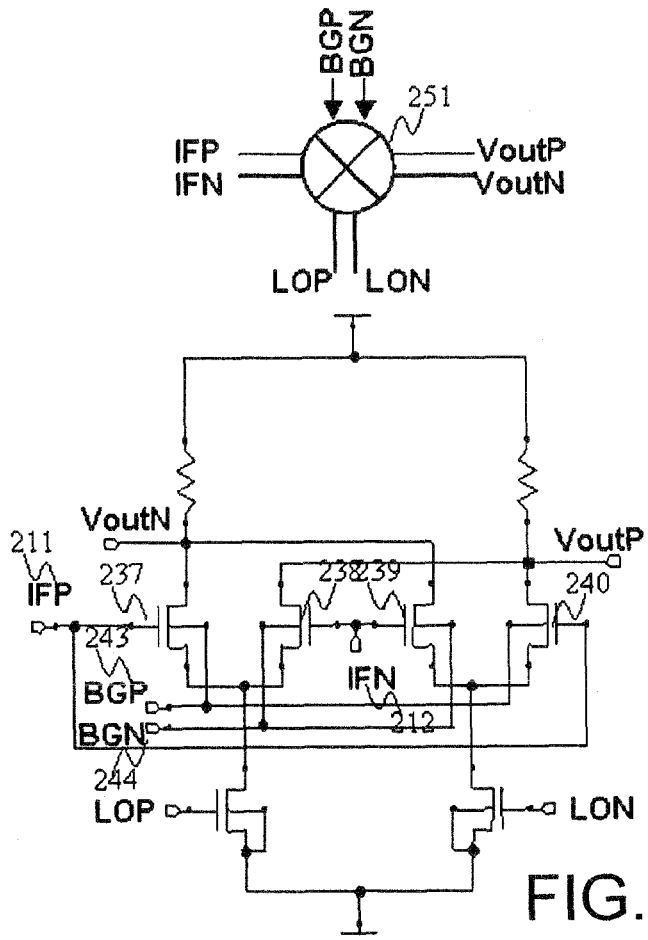
FIG. 8 is a circuit diagram showing another example of the configuration of a modulator in the first exemplary embodiment.

FIG. 8 shows an example of a modulator that can be used in the case where local leakage is detected by a detection circuit (also referred to as "envelope detector"). In contrast to the modulator shown in FIG. 6, modulator 251 shown in FIG. 8 lacks a switch for local ports and has only two back gate ports. Modulator 251 integrates, as BGP terminal 243, the back gate terminals of middle-stage transistors 237, 240 that connect to non-inverting terminal IFP 211 of baseband signals or IF signals, and integrates, as BGN terminal 244, the back gate terminals of middle-stage transistors 238, 239 that connect to inverting terminal IFN 212 of baseband signals or IF signals.

In the circuit shown in FIG. 8, the local leakage is measured and differential voltage ΔVBG between BGP terminal 243 and BGN terminal 244 is then adjusted to minimize the local leakage. Regarding the relation between ΔVBG and local leakage, as explained in FIG. 7C, when there is impairment in a differential pair, local leakage typically becomes a minimum not when ΔVBG is at zero but when ΔVBG is a particular value other than zero. A particular amount of local leakage is produced by the impairment between differential transistors 237, 238, an additional amount of local leakage is produced by impairment between the other differential transistors 239, 240, and the amount of local leakage of the combined local leakages appears in the modulator output, but the two back gate terminals with such connection enables adjustment to minimize the local leakage.

In the configuration of FIG. 8, the configuration of the modulator itself is simple but requires a mechanism for halting baseband signals when detecting local leakage. On the other hand, although the number of switches and terminals as the composition of the modulator itself in the configuration of FIG. 6 is increased compared to that of FIG. 8, this configuration basically does not require a further mechanism for detecting local leakage.

These modulators can also be similarly used in an SSB mixer or the like in a synthesizer, and further, can be used in mixing or multiplication of various types of signals without relation to wireless uses. Mixers and analog multipliers generally have the same functions. The selection of the configuration of FIG. 6 or the configuration of FIG. 8 can be determined as appropriate depending on, for example, the location of use in the system, or depending on whether IF port signals are to be halted.

Normally, impairment such as variation of the threshold voltage Vt differs according to the transistor size, and impairment on the order of from several millivolts to several tens of millivolts is produced even in differential pair transistors that have been laid out with care. Current control realized by back gates has a sensitivity that is 1/n the sensitivity of current control from gates, where n is an integer ranging from several ones to several tens. As a result, the control range of ΔVBG must be from several tens of millivolts to several hundreds of millivolts.

Generally, variation can be decreased by increasing the transistor size, but enlargement of the transistor size entails the disadvantages of greatly increasing power consumption and parasitic capacitance. In particular, increasing transistor size to obtain ultra-high-frequency characteristics on the order of 10 GHz entails a great increase of power consumption and is therefore not advisable. Limiting gate length to a size of several tens of micrometers is appropriate for limiting the bias current of a modulator to the order of several milliamperes, and if impairment such as the variation of the threshold voltage Vt in such a case is considered, the variable range of coarse-adjustment voltages that can be selected can be as large as 500 mV and more preferably on the order of 300 mV.

Adopting a variable range that is too large entails an increase in the number of lines of an analog bus to obtain the same correction resolution and is therefore inadvisable. Further, back gate control that goes too far toward forward bias side raises the danger of current flowing to the substrate. Implementing back gate control with respect to the middle-stage transistors has the advantage of impeding forward direction biasing of the voltage across the back gates and sources of the middle-stage transistors, because the source potential of the middle-stage transistors is higher than the ground potential GND by the amount of the voltage across the drains and sources of the tail stage transistors.

The variable range of the fine-adjustment voltages is preferably made the minimum step of the coarse adjustment voltages for realizing a lower number of lines of the analog bus. The fine-adjustment voltages are preferably in the vicinity of the center of the coarse-adjustment voltage range. This is because $\Delta$VBG must be a positive or negative value. The minimum step of the fine-adjustment voltages must have necessary steps in order that impairment such as local leakage fall within specifications. For example, when the minimum step is on the order of 10 mV and the sensitivity of the back gates is on the order of 1/10 the gate, Vt variation is corrected with an accuracy on the order of 1 mV, and impairment such as local leakage or offset of an amplifier can be kept within product specifications for most uses.

Although the degree to which local leakage must be decreased varies depending on the specifications of the wireless system, average power on the order of −10 dBm is spread to a bandwidth of 500 MHz to realize a power density of −40 dBm/MHz in UWB, and the amount of local leakage must be decreased to no more than −40 dBm, whereby the amount of local leakage must be no more than −30 dBc of the fundamental wave of the local signal, and preferably no more than −40 dBc.

Figure 4:
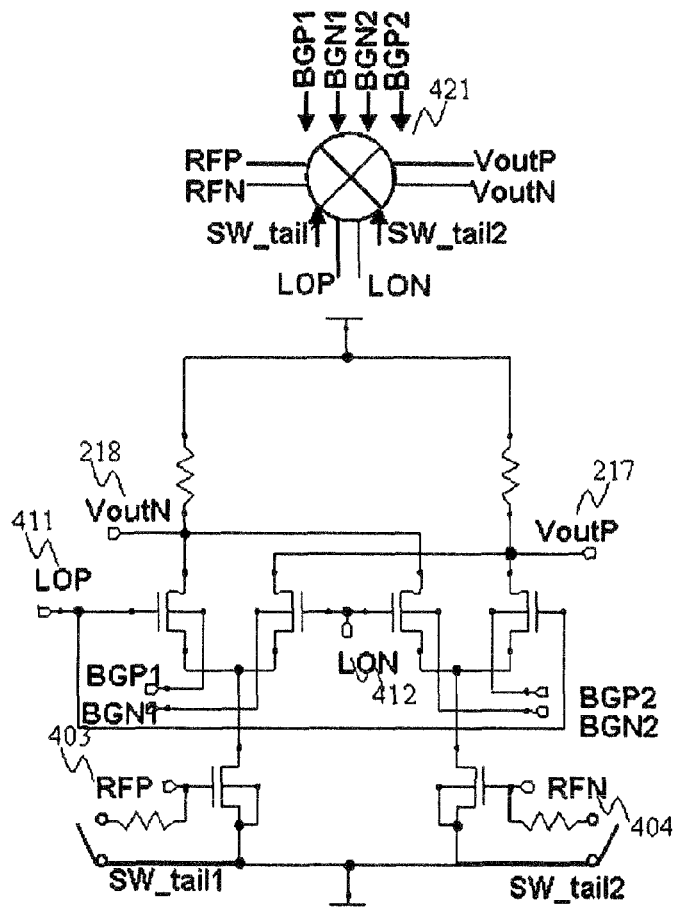
FIG. 4 is a circuit diagram showing an example of the configuration of a demodulator in the first exemplary embodiment.

FIG. 4 shows an example of a demodulator that is used in the present exemplary embodiment as described above. The basic configuration of this demodulator 421 is similar to that of the modulator shown in FIG. 6, but differs in that RF ports 403, 404 are set in the tail-stage gates and LO ports 411, 412 are set in the middle-stage ports. In this case, the baseband signal appears in the output ports 217, 218, but even if the LO ports approach the output ports and the local signal appears at the output ports, the large frequency difference between baseband signal and local signal enables elimination of the influence of local leakage in, for example, the LPF that follows this demodulator. This configuration, in which the local signal is applied as input to the middle stage, has the advantage of increasing the conversion gain at which the RF signal is converted to the baseband signal.

Figure 9A:
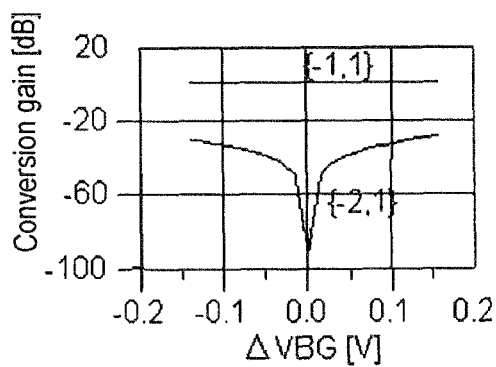
FIG. 9A is a graph showing an example of the relation between offset and sensitivity to twice the local frequency.

The impairment of a demodulator that was problematic in an ultra-wide bandwidth wireless system such as UWB is represented by the conversion gain for twice the local frequency (hereinbelow referred to as "G2fLO") which has been described above. FIG. 9A is a graph showing the relation between $\Delta$VBG and the conversion gain of the fundamental wave {−1,1} and G2fLO {−2,1}. In this case as well, the sensitivity to twice the local frequency is a minimum when $\Delta$VBG is zero, but in a typical demodulator in which impairment exists, the minimum point appears at a particular value other than zero. This problem is the problem of second order distortion, similar to the problem of local leakage in a modulator, and as in the case of a modulator, the output DC offset voltage $\Delta$Vout is observed to implement correction of $\Delta$VBG such that G2fLO is minimized.

Figure 9B:
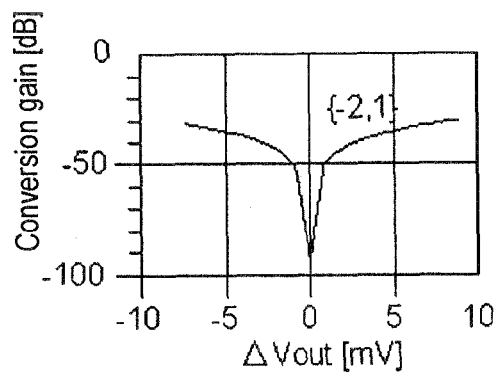
FIG. 9B is a graph showing an example of the relation between offset and sensitivity to twice the local frequency.

In this case as well, the minimum point of G2fLO may not appear at $\Delta$Vout=0 but at points other than zero as shown in FIG. 9B due to different amounts of crosstalk between ports caused by impairment that arises from layout. At this time, as with a modulator, the relation between G2fLO and $\Delta$Vout should be measured in advance in an examination at the time of shipment or in the initial evaluation of a chip to find $\Delta$Vout($\Delta$Vout,opt) at which G2fLO becomes a minimum, and in actual correction, correction of $\Delta$VBG should be carried out such that $\Delta$Vout becomes $\Delta$Vout,opt.

Figure 10:
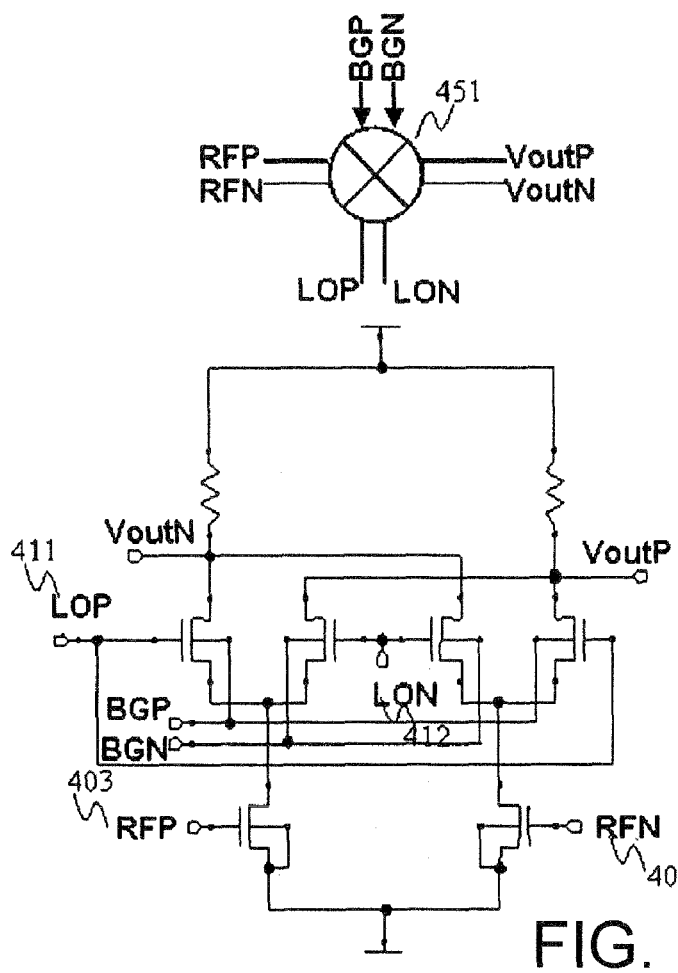
FIG. 10 is a circuit diagram showing another example of the configuration of a demodulator in the first exemplary embodiment.

FIG. 10 shows another example of the configuration of a demodulator. Demodulator 451 shown in FIG. 10 is similar to the demodulator shown in FIG. 4, but differs from the device of FIG. 4 in that tail-stage switches are omitted to integrate the back gate ports, as with the modulator shown in FIG. 8. In this case, a carrier having a frequency in the vicinity of twice the local frequency must actually be applied as input to find $\Delta$VBG at which G2fLO becomes a minimum. A configuration for thus applying a carrier may be prepared on a chip, but when the relation between G2fLO and $\Delta$VBG does not undergo large changes at temperature changes, an examination can be carried out at the time of shipment to set the amount of correction without providing a configuration for applying a carrier as input.

Although the extent to which G2fLO is to be reduced varies depending on the system specifications, gain that is no greater than about −30 dBc of the fundamental wave gain is required so as not to degrade error vector amplitude EVM of QPSK (Quadrature Phase Shift Keying) modulation or a higher level of multilevel modulation. The G2fLO component is preferably suppressed to a level of about −40 dBc or less.

Figure 11A:
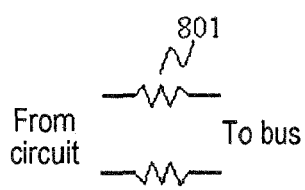
FIG. 11A is a circuit diagram showing an example of the configuration of a detector in the first exemplary embodiment.
Figure 11B:
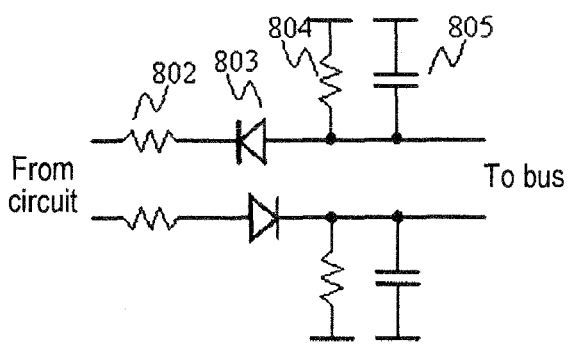
FIG. 11B is a circuit diagram showing another example of the detector in the first exemplary embodiment.
Figure 11C:
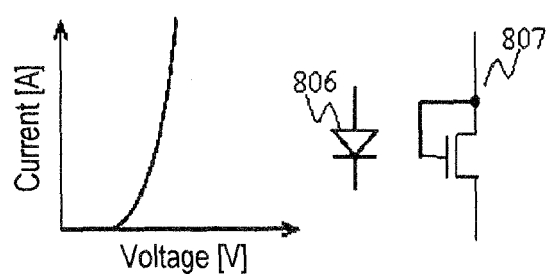
FIG. 11C is a view for explaining a diode used in the detector in the first exemplary embodiment.

FIGS. 11A to 11C show examples of detectors for measuring impairment. FIG. 11A is an example of detector resistors 801 connected to a circuit to be measured, the detector here being composed of two resistors. FIG. 11B is an example of a detection circuits (envelope detectors) connected to the circuit to be measured, the detection circuits here each being composed of: resistor 802; diode 803 having its cathode connected to resistor 802; resistor 804 connected to the anode of diode 803; and capacitor 805 connected in parallel to resistor 804. In the case of a differential signal system, the detector has paired structures corresponding to "true" and "bar" (inverted) (or 0 and π in phase angles) and is made up from two resistors as in the circuit shown in FIG. 11A or detection circuits in two systems as shown in FIG. 11B. In the case of the circuit shown in FIG. 11B, the polarities of the diodes are mutually inverted as "true" and "bar."

The operation of the detector composed of resistors shown in FIG. 11A has already been explained. When the detection circuit of FIG. 11B is placed in operation, resistors 802 are connected to the terminals to be measured of the circuit such as a modulator that is to be measured, the RF signals from the measured terminals are detected by diodes 803, and the detected signal is subjected to the first integration process executed by resistors 804 and capacitors 805. In the detection of local leakage, only local leakage appears at the measured terminal when the baseband signal has been turned OFF, and the value obtained as the detection result is therefore a DC signal that is in proportion to the local signal. The DC signal that is here detected appears in monitor bus 109 by way of switch 108 of FIG. 3 and is further both integrated by integration circuit 110 and amplified.

As previously described, the configuration of FIG. 11A that uses resistors when measuring impairment of a circuit such as a mixer or amplifier is preferable for reducing the overhead of area, power, and parasitic capacitance. The configuration of FIG. 11B has no constantly flowing current other than the slight bias current that flows to the diodes. From the standpoint of area on the chip, all of the elements of FIG. 11B can be made up in an area on the order of just several micrometers square. The influence of parasitic capacitance and parasitic resistance of elements such as diodes can be made substantially negligible by making the value of resistors 802 greater, for example ten times greater, than the impedance of the measured terminals.

As diode 803, normal PN diode 806 having characteristics such as shown in FIG. 11C can be used, or alternatively, an NMOS or PMOS transistor having a diode-connected gate and drain as shown by reference number 807 in FIG. 11C can be used in a CMOS circuit.

A device having the configuration such as shown in FIGS. 12A to 12D can be considered for use as switch 108 (see FIG. 3) for controlling whether detector output is sent to monitor bus 109 or not.

Figure 12A:
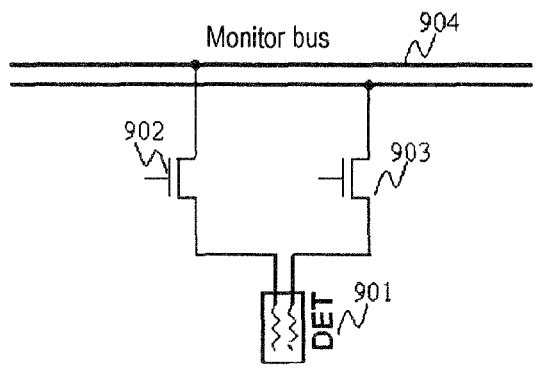
FIG. 12A is a circuit diagram showing an example of the relation between the monitor bus and switches in the first exemplary embodiment.
Figure 12B:
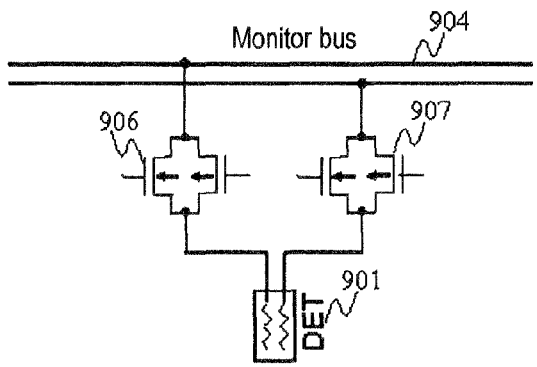
FIG. 12B is a circuit diagram showing another example of the relation between the monitor bus and switches in the first exemplary embodiment.

FIG. 12A shows an example in which NMOS or PMOS transistor switches 902, 903 are used. This type of switch of single MOS configuration is simple and preferable if the operating point of the output of detector (DET) 901 is close to the ground potential (also referred to as the GND potential or VSS potential) in the case of an NMOS transistor switch, and close to the power supply voltage (also referred to as the VDD potential) in the case of a PMOS transistor switch. FIG. 12B shows an example that uses so-called transfer gate switches 906, 907 in which NMOS and PMOS are combined. This configuration is preferable when low resistance is desired in a wide range from the ground potential to the power supply voltage. Either of FIGS. 12A and 12B is a differential configuration in which two bus lines are provided for monitor bus 904, and in which detector 901 has differential outputs. In FIG. 12A, the differential outputs of detector 901 are connected to monitor bus 904 by way of switches 902, 903, respectively; and in FIG. 12B, the differential outputs of detector 901 are connected to monitor bus 904 by way of switches 906, 907. As previously described, a differential configuration has robust characteristics with respect to crosstalk such as substrate noise.

Figure 12C:
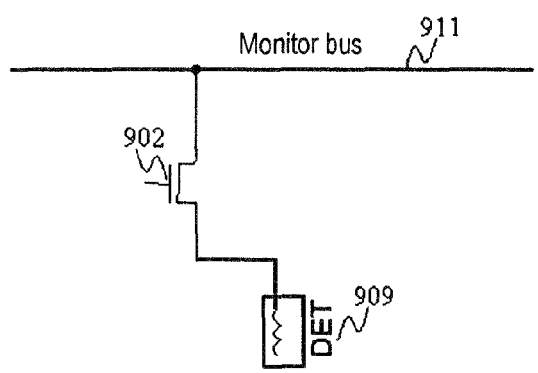
FIG. 12C is a circuit diagram showing another example of the relation between the monitor bus and a switch in the first exemplary embodiment.
Figure 12D:
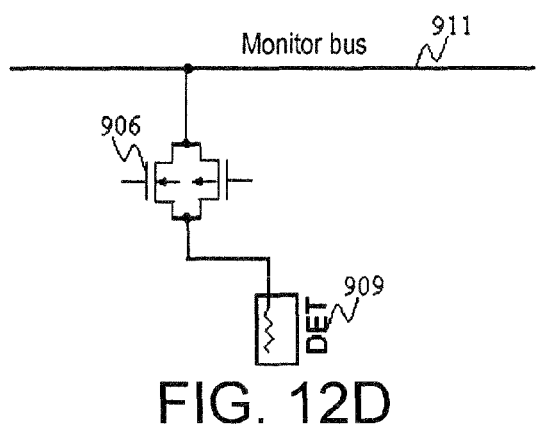
FIG. 12D is a circuit diagram showing another example of the relation between the monitor bus and a switch in the first exemplary embodiment.

The configurations shown in FIGS. 12C and 12D are cases in which the differential configurations of FIGS. 12A and 12B are changed to single configurations. In these cases, detector (DET) 909 is of a single-output configuration, and monitor bus 911 is also of a single construction. These configurations can be used in cases in which a single configuration is adopted due to lower power of the circuit that is to be measured. In a system in which a differential system and single system are mixed, the configurations shown in, for example, FIGS. 12A and 12B can be used and mixing can be realized in a system that is to be measured that is single by connecting one signal to the ground point.

As integration circuit 110 of FIG. 3, a circuit can be used that eliminates unnecessary noise and passes the DC voltage. The integration circuits shown in each of FIGS. 13A to 13D and the filters such as shown in FIGS. 14A and 14B can be used as this type of circuit. A band-limited amplifier has functions equivalent to a filter.

Figure 13A:
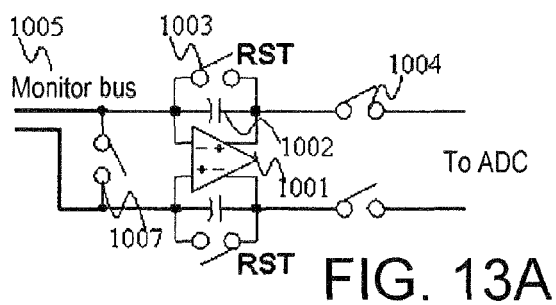
FIG. 13A is a circuit diagram showing an example of the configuration of an integration circuit in the first exemplary embodiment.
Figure 14A:
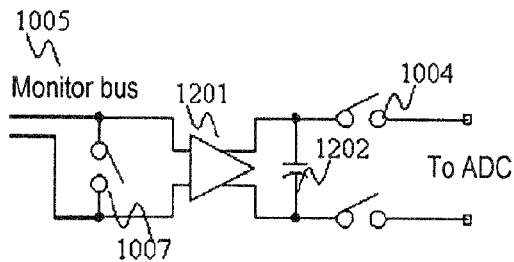
FIG. 14A is a circuit diagram showing another example of the configuration of an integration circuit in the first exemplary embodiment.
Figure 14B:
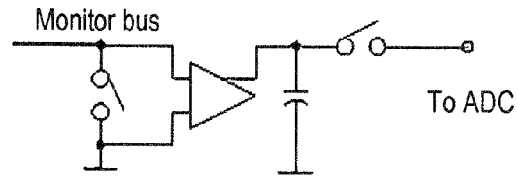
FIG. 14B is a circuit diagram showing another example of the configuration of an integration circuit in the first exemplary embodiment.

In the circuit shown in FIG. 13A, monitor bus 1005 of differential configuration is connected to the differential inputs of operational amplifier 1001, and switch 1007 is provided to short-circuit between these differential inputs. Capacitors 1002 and reset switches 1003 for resetting capacitors 1002 are provided between the differential outputs and the differential inputs of operational amplifier 1001. The differential outputs of operational amplifier 1001 are supplied to an ADC by way of switches 1004.

Explanation next regards the operation of the integration circuit shown in FIG. 13A. In order to switch the input of an ADC that is normally connected to the VGA of a receiver or the like to the integration circuit, the receiver output is cut from the ADC and switch 1004 is turned ON. To measure the input offset of operational amplifier 1001 itself, bus switch 1007 is turned ON and reset switch 1003 is released from the reset state to begin integration. Following integration of a fixed time interval, the offset of operational amplifier 1001 itself passes through the ADC and is taken in by the control circuit. In a normal measurement of impairment, detector switch 108 of the circuit to be measured is turned ON without turning bus switch 1007 ON, whereby a detector signal is generated in the monitor bus and the above-described integration operation is carried out.

For current I that flows in the integration circuit, the gain of the integration output is represented by t/Cint and the integration band is represented by 1/(2t), where t is the integration time interval and Cint is the capacitance value of integration capacitor 1002. In the present exemplary embodiment, t and Cint should be determined according to the necessary gain and bandwidth. When, for example, approximately 1 μs is set as the integration time interval t, the bandwidth is 500 KHz. Thus, even when the monitor bus is wrapped around and crosses the chip, the influence of noise that enters the monitor bus or of thermal noise and 1/f noise generated at detectors or switches can be reduced to a negligible level.

Figure 13B:
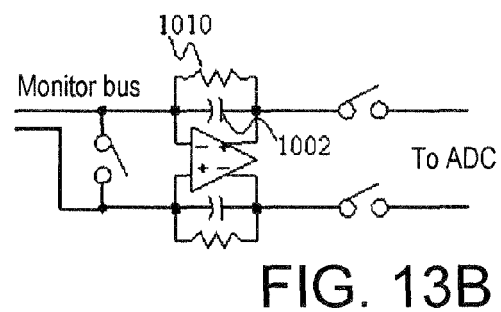
FIG. 13B is a circuit diagram showing another example of the configuration of an integration circuit in the first exemplary embodiment.

The integration circuit shown in FIG. 13B is provided with resistors 1010 in place of reset switches 1003 in the circuit shown in FIG. 13A and thus discharges and clears previous (past) information stored in reset capacitors 1002. Completely clearing previous information places limitations on the integration gain and integration bandwidth, but has the advantage of allowing omission of the reset switches.

Figure 13C:
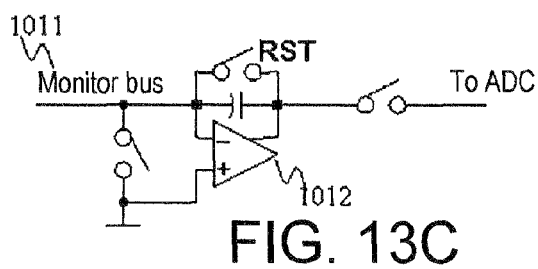
FIG. 13C is a circuit diagram showing another example of the configuration of an integration circuit in the first exemplary embodiment.
Figure 13D:
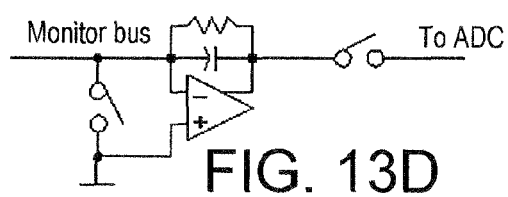
FIG. 13D is a circuit diagram showing another example of the configuration of an integration circuit in the first exemplary embodiment.

The integration circuits shown in FIGS. 13C and 13D correspond to the circuits of FIGS. 13A and 13B but are circuits used when the monitor bus is of single configuration rather than of differential configuration. An integration operation similar to the above-described operation is carried out by monitor bus 1011 of single configuration and single-end operational amplifier 1012. The non-inverting (+) input terminal of the operational amplifier is grounded. As previously described, this type of single configuration has the effect of achieving lower power when there is little influence from, for example, crosstalk noise.

Figure 15A:
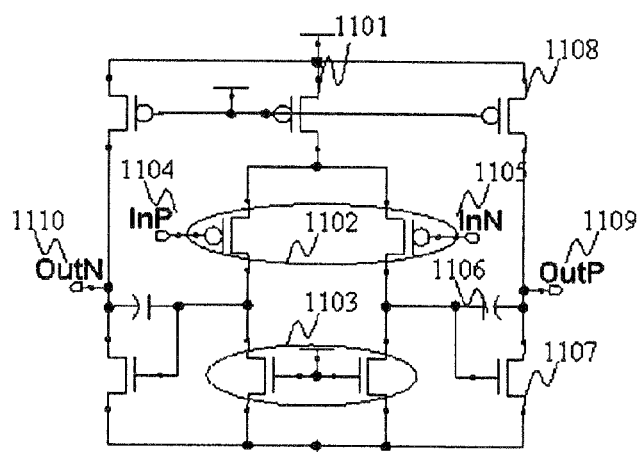
FIG. 15A is a circuit diagram showing an example of the configuration of an operational amplifier used in the integration circuit.
Figure 15B:
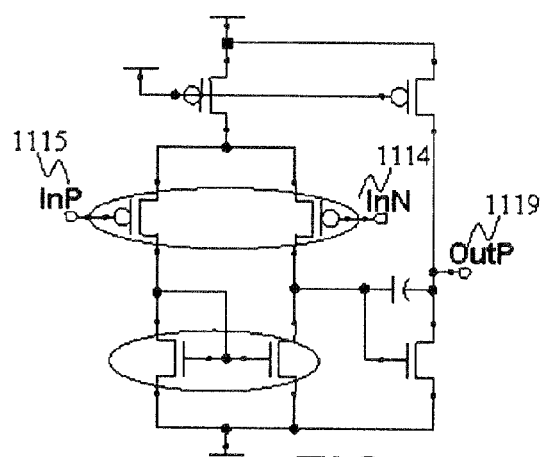
FIG. 15B is a circuit diagram showing another example of the configuration of an operational amplifier used in the integration circuit.

FIGS. 15A and 15B show examples of the configuration of an operational amplifier used in this type of integration circuit. In a process node that has undergone miniaturization to the sub-100-nm level, the power supply voltage falls to the order of 1V or less, and a configuration is therefore required in the impairment monitoring system that can also operate at low voltage. FIG. 15A shows an example of a differential operational amplifier circuit in which the number of vertically stacked levels of transistors has been reduced. This operational amplifier is provided with: current-source transistor pair 1101, differential pair 1102, load transistor pair 1103, and output buffer transistor pairs 1107, 1108; and further, phase compensation capacitor 1106 is connected to buffer transistor pair 1107, differential inputs 1104, 1105 are connected to differential pair 1102, and differential outputs 1109, 1110 are connected to the outputs of buffer transistor pair 1107.

Normally, when the number of cascade levels of transistors, i.e., the number of vertically stacked levels, is limited, a cascade construction cannot be used to increase the drain resistance and the open-loop gain is therefore low. However, in the configurations shown in FIGS. 15A and 15B, the provision of buffers in differential pairs allows open-loop gain on the order of 50 to 100 dB to be obtained in a construction having few vertically stacked levels. The differential pairs are preferably composed of PMOS transistors to reduce 1/f noise.

The operational amplifier shown in FIG. 15B is of a device in which the operational amplifier of FIG. 15A is of single-end construction. Input is received by differential inputs 1114, 1115, and output is delivered from single output 1119. This circuit is suitable for reducing power consumption in a specification that permits a single configuration.

FIGS. 14A and 14B show examples in which a gmC filter that employs a transconductance amplifier (OTA) and capacitor is used as an integration circuit. In the integration circuit shown in FIG. 14A, monitor bus 1005 of a differential configuration is connected to the differential inputs of OTA 1201, and switch 1007 is provided for short-circuiting between these differential inputs. The differential outputs of OTA 1201 are connected to an ADC by way of switches 1004. Capacitor 1202 is connected in parallel to the pair of differential outputs of this OTA 1201.

In the circuit shown in FIG. 14A, the impairment signal from the circuit to be measured is applied as input to OTA 1201 by way of a monitor bus, and bandwidth limitation is realized by low-pass filter characteristics determined by the mutual conductance gm of the OTA and capacitance C of capacitor 1202. Although the example shown here is a first order low-pass filter, a higher-order filter can of course be formed by adding an OTA or capacitors as necessary. Further, the OTA can of course be controlled to provide the capability of switching gain. The circuit shown in FIG. 14B is of a configuration in which the circuit shown in FIG. 14A is made a gmC filter of single construction, this configuration being suitable for reducing power consumption in specifications that allow the single configuration.

An integration circuit configuration that uses this type of gmC filter has the effects of enabling the reduction of the cut-off frequency even when an integration capacitor having low capacitance is used, and of narrowing the noise bandwidth to reduce noise.

Figure 16:
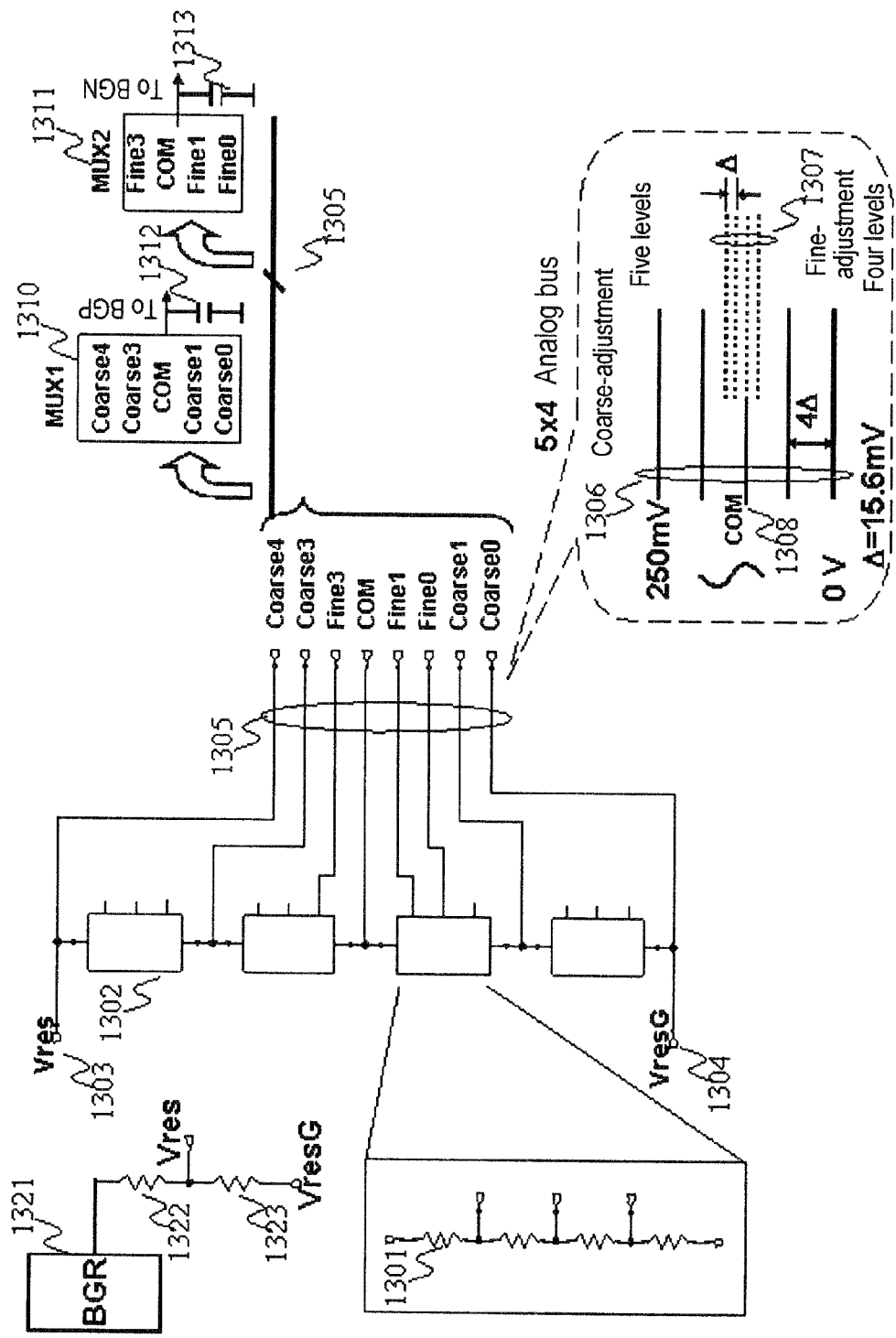
FIG. 16 is a circuit diagram showing an example of a multilevel voltage generator, an analog bus, and circuits peripheral to these circuits in the first exemplary embodiment.

FIG. 16 is a circuit diagram and explanatory view showing an example of a multilevel voltage generator (MLVG) and an analog bus and peripheral circuits of these components.

Multilevel voltage generator (MLVG) is provided with: ladder resistor 1302 that are made up from a plurality of resistors 1301 and reference voltage sources (Vres and VresG) 1303, 1304. The multilevel voltage generator is connected to analog bus 1305. Analog bus 1305 is provided with: coarse-adjustment voltage group (Coarse0, Coarse1, Coarse3, and Coarse4) 1306, fine-adjustment voltage group (Fine0, Fine1, and Fine3) 1307, and common voltage (COM) 1308 that is common to both coarse-adjustment voltage group and fine-adjustment voltage group. Multiplexer (MUX1) 1310 for coarse-adjustment voltages and multiplexer (MUX2) 1311 for fine-adjustment voltages are provided between analog bus 1305 and the circuit to be corrected such as a demodulator; and capacitors 1312, 1313 are connected to the outputs of multiplexers 1310, 1311, respectively. Bandgap reference (BGR) 1321 and resistors 1322, 1323 are provided for generating reference voltages Vres and VresG.

In this analog bus correction system, BGR 1321 generates, for example, a reference voltage having extremely low temperature dependency of about 1.2 V. The temperature dependency of the reference voltage differs according to the circuit configuration, but temperature dependency within 50 to 100 ppm/° C. can be obtained even when trimming is not carried out in the fabrication process of the BGR. If trimming is carried out by means of a fuse resistor, temperature dependence within 50 ppm/° C. can be achieved. The output voltage of BGR 1321 is potential-divided by resistors 1322, 1323 to generate reference voltages Vres and VresG that are optimum for the circuit to be corrected. When correcting the back gate voltage of a differential pair made up from NMOS transistors, variation in transistors having a gate length of the previously described several tens of micrometers can be treated by setting the reference voltage to a voltage preferably on the order of 0.2 to 0.3 V, and to a voltage on the order of 0.2 to 0.5 V if there is a margin. As the method of dividing potential of the voltage, a configuration can of course be used in which transistors or diodes are connected in a series and in which resistors are not used.

Reference voltage Vres 1303 and reference voltage VresG 1304 are the voltages that serve as the reference for correction and are preferable isolated from other wiring. In particular, even if VresG 1304 is, for example, 0 V, VresG is preferably isolated from the global ground (GND) wiring. This preference arises from the fact that return currents from hetero circuit blocks travel back and forth in global power supply wiring and these return currents are multiplied with the wiring resistance to produce IR drop, whereby changes in voltage can occur in some locations when the bias current of hetero circuits changes due to, for example, changes in temperature.

Resistor 1301 is a part in which a constant current flows, and the resistance of resistor 1301 is therefore preferably increased in the interest of achieving lower power consumption, but excessive increase of this resistance raises the problem of increasing the time constant of the analog bus. Setting the resistance of resistor 1301 to the order of 100Ω results in a time constant of from several nanoseconds to several tens of nanoseconds and a current on the order of 100 μA flowing through the ladder resistor in the configuration of FIG. 16, and this state presents no problems either in terms of current consumption or time constant. A further reduction of power consumption can be achieved by preventing current from flowing through ladder resistor 1302 when the operation of the chip or the operation of the system is at sleep. There is further no problem regarding the above-described time constant in the recovery time from sleep.

Coarse-adjustment voltage group 1306 in FIG. 16 is realized by selecting among five voltages at equal intervals between reference voltages 1303, 1304. The center voltage between reference voltages 1303, 1304 is common voltage (COM) 1308, and this common voltage is shared between coarse-adjustment voltage group 1306 and fine-adjustment voltage group 1307. Thus, even though there are eight analog buses, correction is possible on a total of 20 levels (=4×5) by means of the four coarse-adjustment voltages and the five fine-adjustment voltages.

Fine-adjustment voltage group 1307 is preferably generated around the center voltage between reference voltages 1303, 1304 to widen the correction range while maintaining a particular correction resolution with the same number of lines of a buse. The output of multiplexer 1310 is connected to, for example, the P terminal of differential pair back gates, and the output of multiplexer 1311 is connected to the N terminal of the differential pair back gates. {(P terminal voltage)−(N terminal voltage)} is a maximum when Coarse4 is taken as the coarse-adjustment voltage and Fine0 is taken as the fine-adjustment voltage. {(P terminal voltage)−(N terminal voltage)} is a minimum when Coarse0 is taken as the coarse-adjustment voltage and Fine3 is taken as the fine-adjustment voltage. To maximize this variable range of "P terminal voltage−N terminal voltage," the center of the voltage range of the fine-adjustment voltage group preferably substantially matches the center of the voltage range of the coarse-adjustment voltage group.

In this example, 0 to 250 mV is set as the coarse-adjustment voltage range, and the range 109 to 156 mV around 125 mV is set as the fine-adjustment voltage range. The range of the fine-adjustment voltage group preferably covers the minimum step of the coarse-adjustment voltage group in order that a wide correction range be covered using the same number of lines of a bus and the same resolution. In this example, the minimum step of the coarse-adjustment voltage group is 62.5 mV, and the interior of this coarse-adjustment minimum step is covered by movements of fine-adjustment minimum steps of 15.6 mV.

NMOS or PMOS transistor single switches such as shown in FIGS. 12A to 12D can be used as multiplexers 1310, 1311, as can a transfer gate in which NMOS and PMOS are combined. The arrangement of capacitors 1312, 1313 at the outputs of multiplexers is preferable in order that crosstalk that is mixed in the bus not be conveyed to the circuit that is to be corrected, and further, in order that signals such as the RF signal from the circuit to be measured not enter the bus, and still further, in order that the back gates of the circuit to be measured be ac-grounded. In this case, the provision of a capacitor on the order of 1 pF substantially serves as ground for a signal on the order of 1 to 10 GHz.

Figure 17:
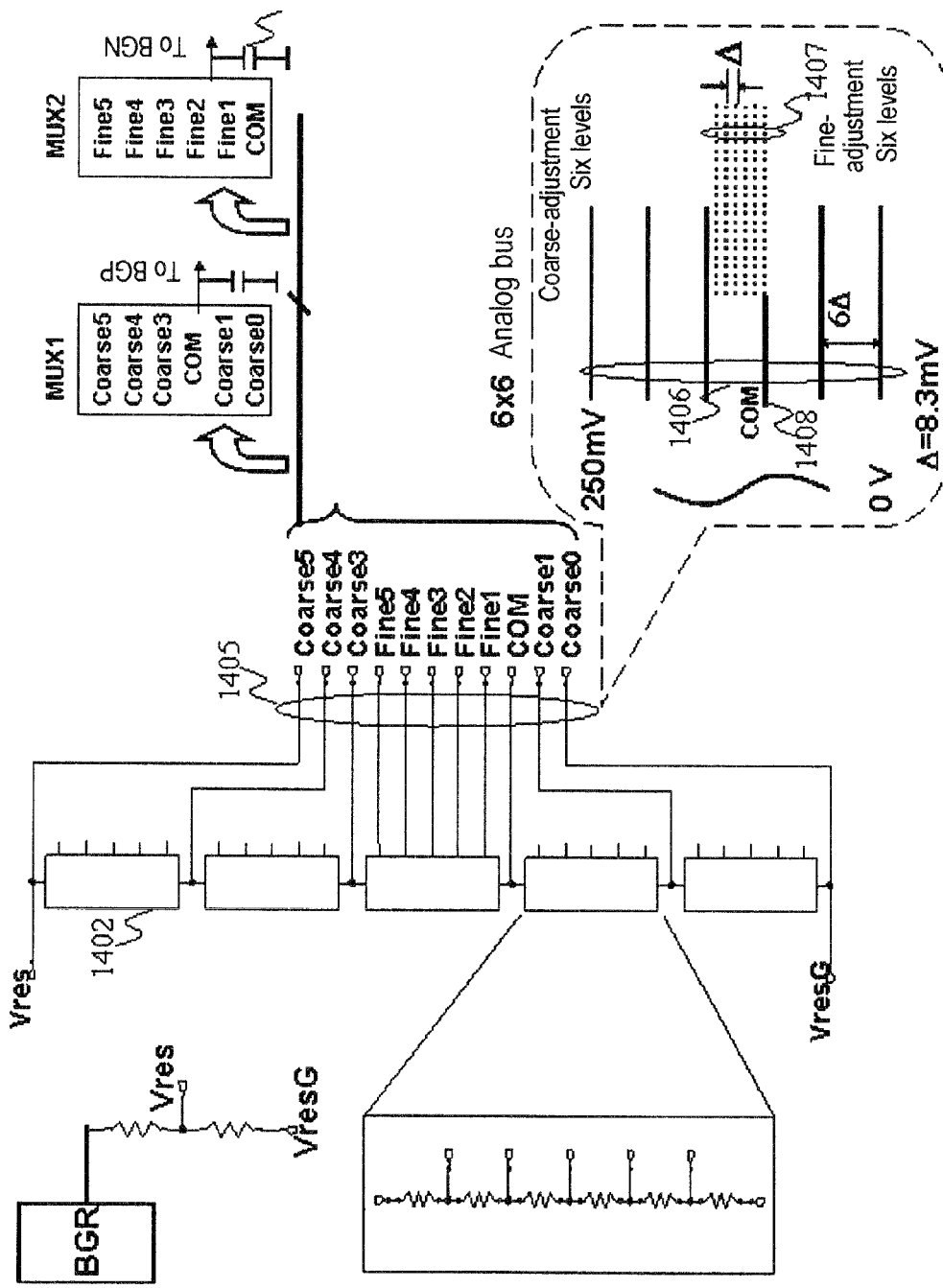
FIG. 17 is a circuit diagram showing another example of a multilevel voltage generator, an analog bus, and circuits peripheral to these circuits in the first exemplary embodiment.

FIG. 17 shows another example of a multilevel voltage generator, analog bus, and the peripheral circuits of these components. In this example, ladder resistor 1402 is used, analog bus 1405 has an eleven-line configuration, and the use of coarse-adjustment voltage group 1406 of six voltages (Coarse0, Coarse1, COM, Coarse3, Coarse4, and Coarse5) and fine-adjustment voltage group a407 of six voltages (COM, Fine0, Fine1, Fine2, Fine3, Fine4, and Fine5) that share one common voltage (COM) 1408 enables correction on 36 levels (=6×6).

Common voltage (COM) 1408 is positioned at the lowest voltage of fine-adjustment voltage group 1407, but the substantial matching of the center of the voltage range of the fine-adjustment voltage group with the center of the voltage range of the coarse-adjustment voltage group widens the correction range with the same number of lines of a bus and at the same correction resolution.

FIG. 18 shows the settings of each of the correction levels in the example shown in FIG. 16. C_0 to C_4 are control signals directing multiplexer 1310 to select the bus voltages Coarse0 to Coarse4, and F_0 to F_3 are control signals directing multiplexer 1311 to select the bus voltages Fine0 to Fine 3. For example, at level 0 (i.e., N=0), the control signals C_4 and F_0 become "1" (active), and the voltage Coarse4 appears in the output of multiplexer 1310 and the voltage Fine0 appears in the output of multiplexer 1311, and these voltages are applied to the back gates P and N, respectively, of the differential pair of the circuit to be corrected. A voltage of 156 mV is thus applied across the back gates P-N, and the threshold voltage Vt of the differential pair transistors is shifted. As previously described, the Vt shift realized by the back gate voltage shift is on the order of one-severalth to one-dozen the applied back gate voltage shift, and Vt is effectively changed by about 10 mV.

When the level number setting is N=19, a voltage of −141 mV is applied across back gate P terminal and back gate N terminal, whereby the effective shift of the threshold voltage Vt is on the order of −10 mV. The effective Vt shift is thus carried out by steps on the order of 1 mV within the range of −10 to +10 mV, enabling handling of correction of the impairment of various hetero circuits.

In the above-described example, correction is by 20 levels (=4×5) realized by an analog bus of a nine-line configuration and by 36 levels (=6×6) realized by an analog bus of eleven-line configuration, but the present invention also enables correction by 64 levels (=8×8) using an analog bus of a 31-line configuration or even more levels depending on the requirements of the system specification. As previously described, in the present exemplary embodiment, the analog bus should be made up from a line-and-space of the order of 1 μm or less, and with the line-and-space of 0.5 μm, the bus width will be only about 31 μm even in the case of an analog bus formed from 31 signal lines, and as a result, the provision of a bus of this type will normally not present a major problem in a hetero SoC having a size of several millimeters square. Even when the number of lines of a bus is increased, only multiplexers and registers are arranged in each circuit to be corrected, and higher accuracy can therefore be achieved without increasing the steady power consumption.

Figure 19:
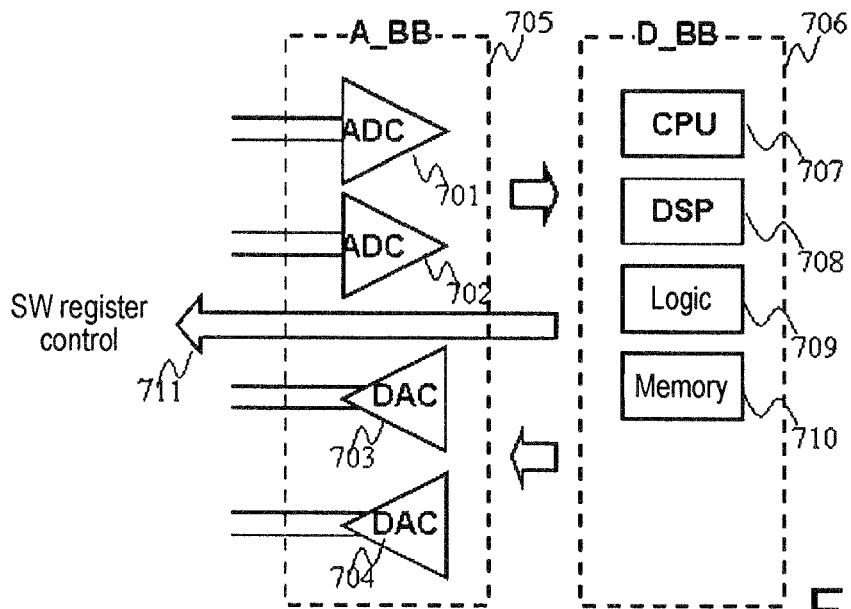
FIG. 19 is a block diagram showing analog baseband circuit parts and digital baseband circuit pairs connected to the circuit shown in FIG. 3.

FIG. 3 shows the RF front end of a direct-conversion transceiver, but FIG. 19 shows analog baseband module (A_BB) that is connected to this RF front end portion, and further, digital baseband module (D_BB) that is connected to this analog baseband module.

Analog baseband module 705 is provided with: ADCs 701, 702 for converting I/Q analog baseband signals from the RF front end to digital signals; and DACs 703, 704 for converting I/Q digital baseband signals from digital baseband module 706 to analog signals. Digital baseband module 706 is provided with, for example, CPU 707, DSP (Digital Signal Processor) 708, hard-wired logic 709, and memory 710 for, in addition to carrying out monitoring of impairment through a monitor bus and correction of variation through an analog bus, for further carrying out FFT (Fast Fourier Transform) or IFFT (Inverse Fast Fourier Transform) processes by OFDM (Orthogonal Frequency-Division Multiplexing), equalizing and pre-equalizing processes, and coding and decoding processes.

It can be considered that the correction of variation is carried out using the control circuit of digital baseband module 706 with the processes by the following algorithms.

Figure 20:
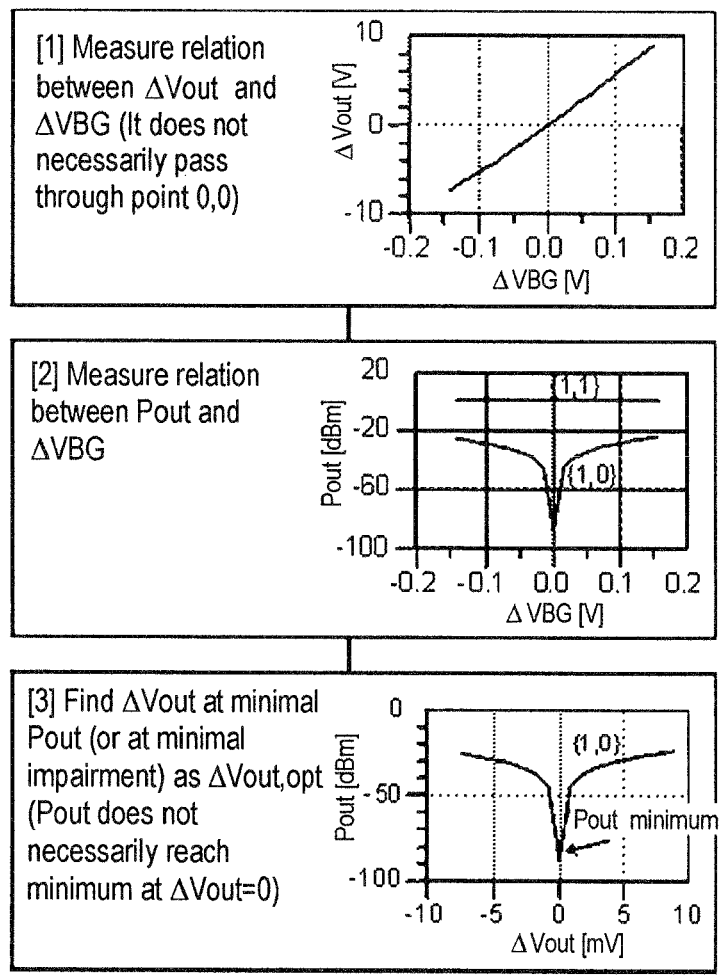
FIG. 20 is an explanatory view of the preprocessing when carrying out correction in the first exemplary embodiment.

FIG. 20 is a view showing the pre-processing when correction is carried out by an analog bus with reference to a look-up table following measurement of impairment by a monitor bus. First, as shown in [1], the relation between ΔVBG and the DC offset ΔVout of the circuit under measurement is measured. Next, as shown in [2], the relation between ΔVBG and impairment such as local leakage of the circuit under measurement is measured. Then, in [3], the DC offset ΔVout,opt at which the amount of impairment such as the local leakage of the circuit under measurement reaches a minimum is found based on the measurements of [1] and [2]. As has been explained, this process is carried out because ΔVout sometimes does not become zero due to layout-type impairment when impairment such as local leakage is zero. As a result, this process may be carried out just once at the time of evaluating the chip or shipping the product. In a circuit that has been laid out well, ΔVout,opt is substantially zero. In addition, when the offset of an amplifier is preferably zero, ΔVout,opt will obviously be zero.

The pre-processing having been carried out as described above, the processing for correction of variation in the present exemplary embodiment is next executed.

Figure 21:
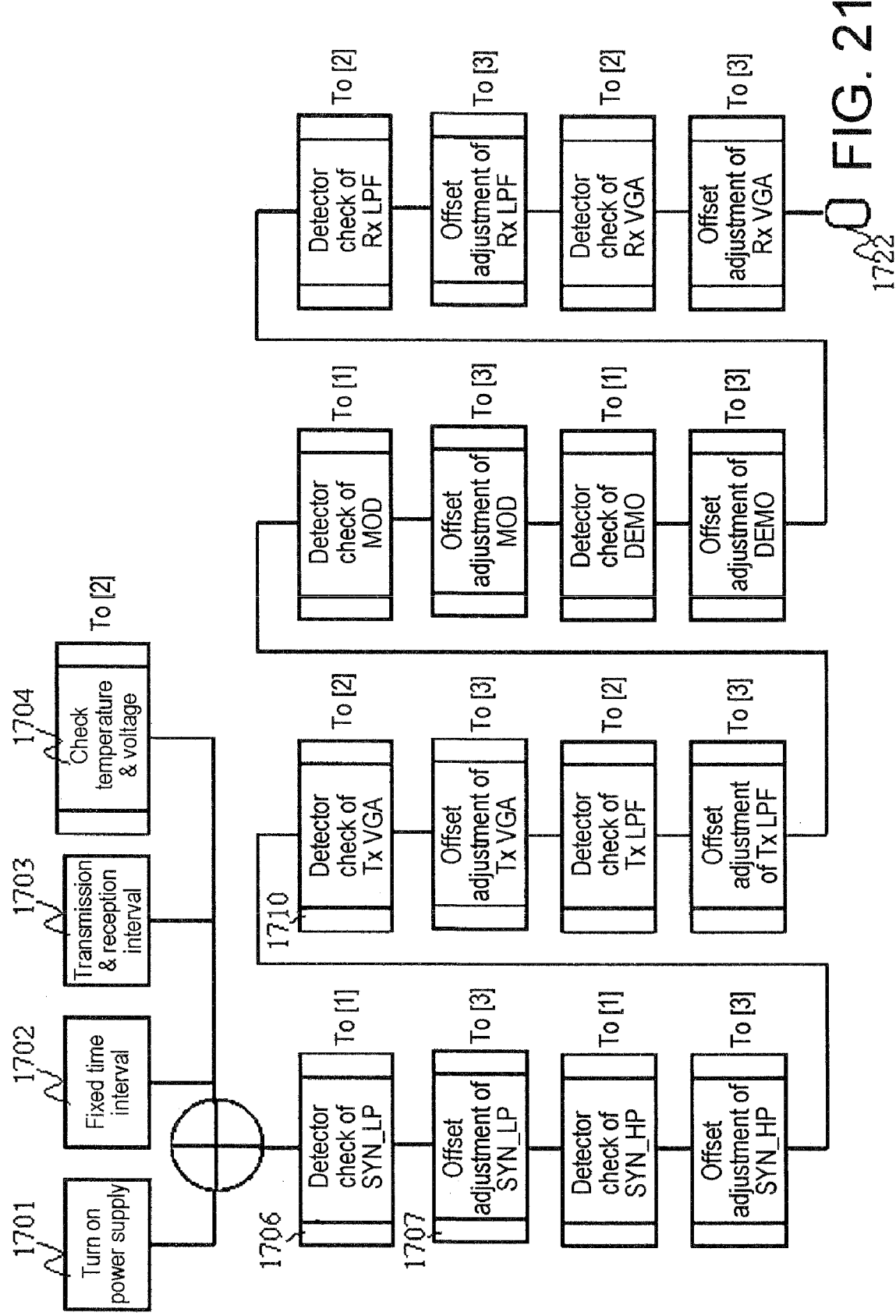
FIG. 21 is a flow chart showing the correction process in the first exemplary embodiment.

As shown in FIG. 21, monitoring and correction are progressively carried out in normal operation based on ΔVout,opt that has been found as described above. Events such as power supply ON (Step 1701), interruptions at fixed time intervals (Step 1702), intervals of switching between transmission and reception (Step 1703), and temperature changes and voltage changes (Step 1704) are preferably used as the triggers for impairment monitoring and correction. With these events as triggers, the measurement of impairment of each part of hetero SoC and correction of these impairments is carried out. For example, relating to low-frequency block (SYN_LF) 122 of the synthesizer of FIG. 3, the sub-routine of [1] in FIG. 22 is executed for checking the detector in this location in Step 1706.

Figure 22:
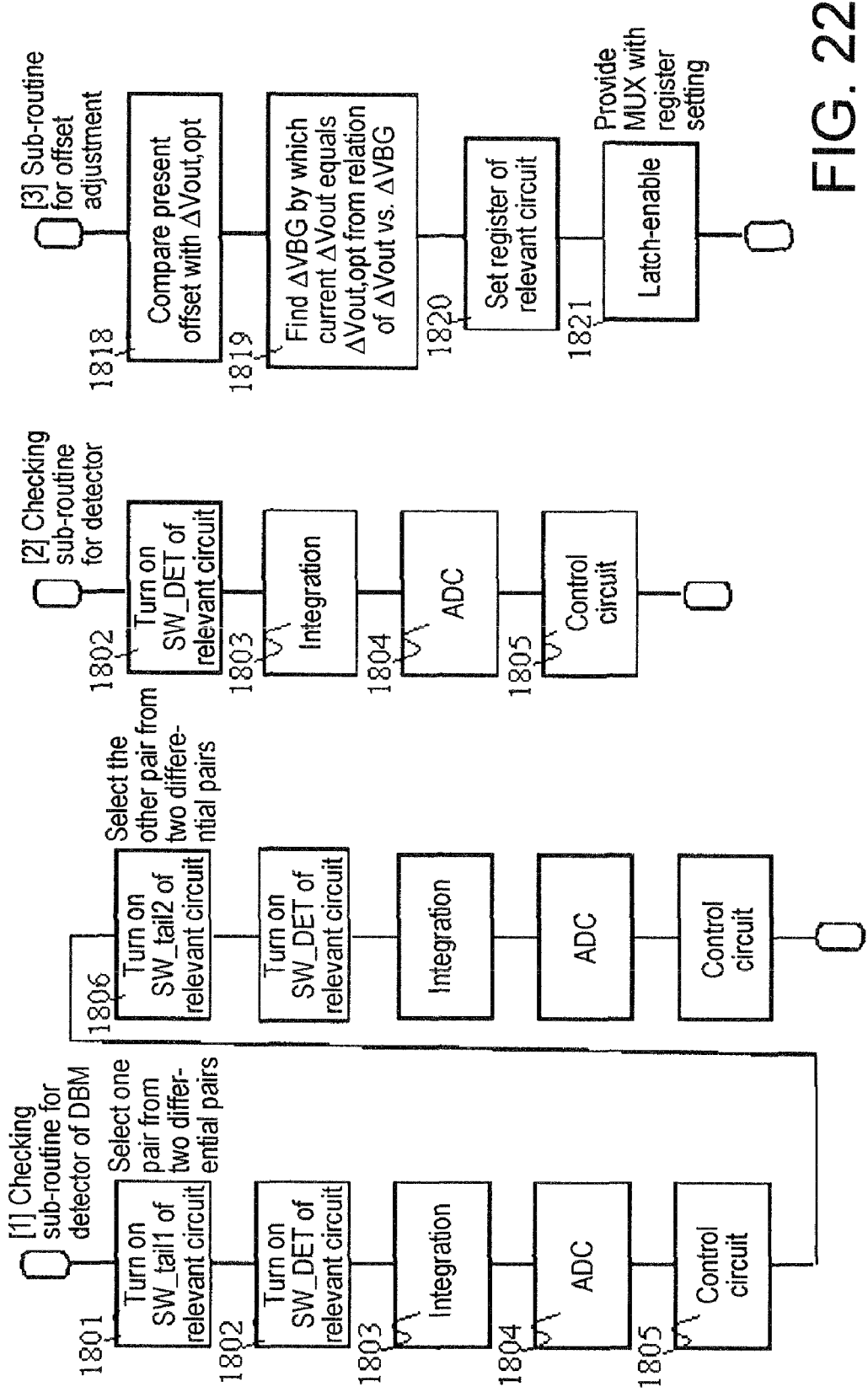
FIG. 22 is a flow chart showing the correction process in the first exemplary embodiment.

The process shown in [1] in FIG. 22 is a step for correcting impairment of a double-balanced mixer wherein: in Step 1801, tail switch SW_tail1 of the relevant circuit is first turned ON and a bias current flows to only one set of the two sets of differential pairs; the detector switch is turned ON in Step 1802; integration is carried out in Step 1803; analog-to-digital conversion (ADC) is carried out in Step 1804; and the conversion results are taken in by the control circuit in Step 1805. In order to similarly measure impairment of the other differential pair, tail switch SW_tail2 is turned ON in Step 1806, and the same process is executed. In this way, the impairment of the two sets of differential pairs is taken into the control circuit.

After the execution of Step 1706, impairment correction is carried out relating to, for example, low-frequency block (SYN_LF) 122 of the synthesizer in Step 1707. Local leakage of a mixer can be considered as the impairment of this location. This local leakage is corrected by treating the DC offset. The process of Step 1707 is carried out by the sub-routine shown by [3] of FIG. 22.

The process of the sub-routine of [3] of FIG. 22 is a step of offset adjustment wherein: in Step 1818, the current $\Delta$Vout acquired in Step 1706 is compared with $\Delta$Vout,opt that has already been found; and $\Delta$VBG is then found in Step 1819 such that $\Delta$Vout equals $\Delta$Vout,opt. For example, the relation between $\Delta$Vout and $\Delta$VBG is substantially a linear relation ($\Delta$Vout=a·$\Delta$VBG+b) such as shown in [1] in FIG. 20, and as a result, if coefficient a of the slope is found in advance, new $\Delta$VBG can be quickly found from the values of the current $\Delta$VBG and $\Delta$Vout by:

$$\Delta VBG = \frac{(\Delta Vout, opt - \Delta Vout)}{a} + \Delta VBG$$

Then, in Step 1820, the new $\Delta$VBG is set to the register of the relevant circuit, and by enabling a latch in Step 1821, a setting is conferred to the multiplexer for correction of the relevant circuit and the correction completed. In a double-balanced mixer, there are two sets of differential pairs, and because two $\Delta$Vout are supplied as shown in [1] of FIG. 22, there are of course two $\Delta$VBG for correcting as well.

A detector check and offset adjustment is then similarly carried out for a synthesizer high-frequency module (SYN_HF), offset measurement and offset correction are carried out successively for other circuit blocks of hetero circuits, and when offset measurement and offset correction have been completed for all circuit blocks, the process ends in Step 1722. In the detector checks of circuits such as VGA that have only one differential pair, the subroutine shown in [2] of FIG. 22 is executed. The process of the sub-routine of [2] of FIG. 22 is a process similar to [1] of FIG. 22 with the exception that there is no tail switch control. The process flow shown in FIG. 21 has the advantage of reduced memory of the control circuit portion.

Figure 23:
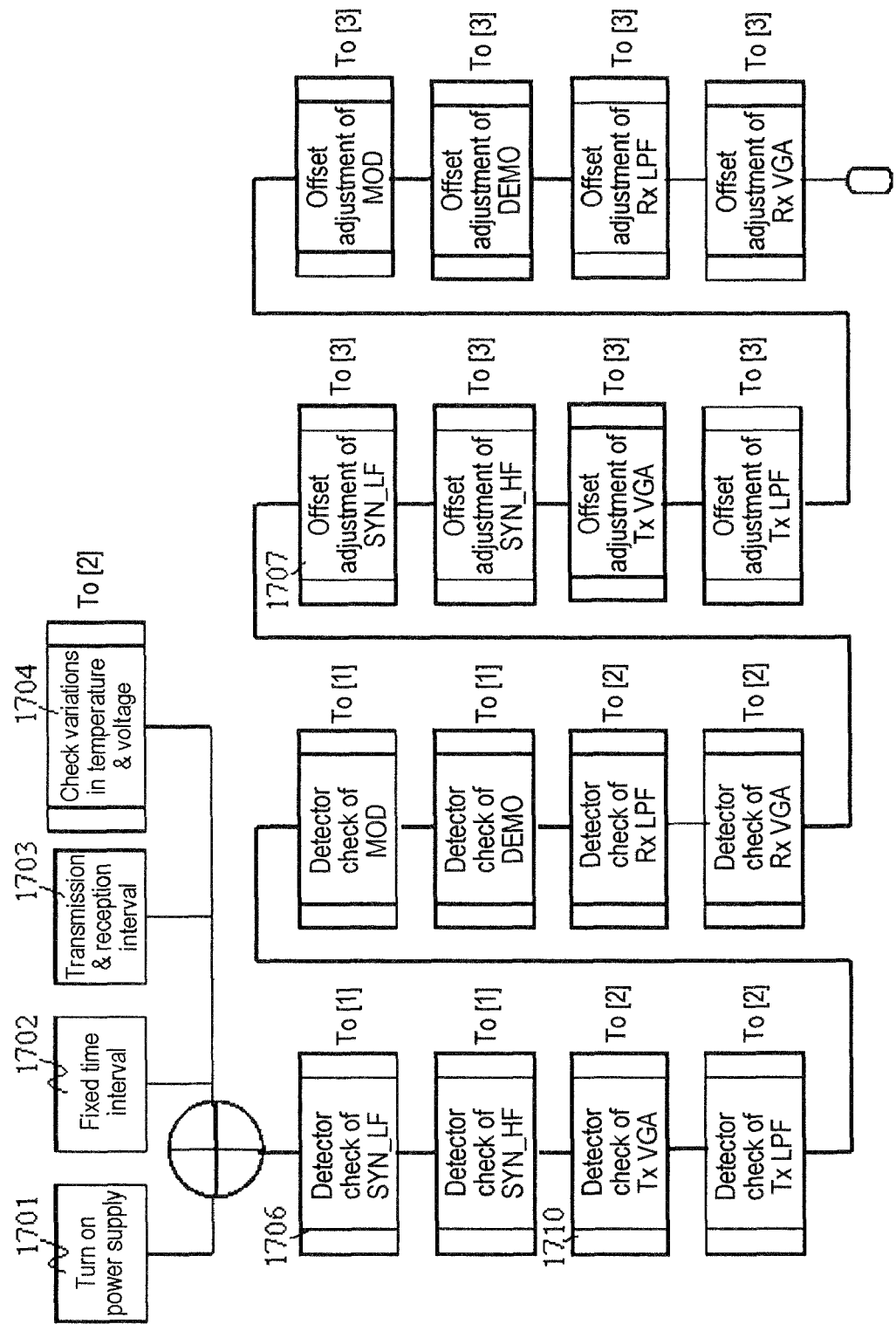
FIG. 23 is a flow chart showing the correction process in the first exemplary embodiment.

In the process shown in FIG. 21, the detector check and offset adjustment of each block in hetero circuits are carried out continuously, but as shown in FIG. 23, it is also possible to first carry out only the detector checks of each block in hetero circuits all at once and then carry out the offset adjustments all at once. Due to the time constant of an analog bus system, disturbances caused by settings of multiplexers may in some cases remain for a certain time interval on the analog bus, and as a result, the flow shown in FIG. 23 is preferable when all detector checks must be carried out first in a quiet state in which switching of the analog bus is not carried out.

The above-described explanation for the flow chart of FIG. 21 assumed that $\Delta$VBG is uniquely found based on $\Delta$Vout that has been obtained by finding slope a in advance, but $\Delta$VBG may be found by a method in which $\Delta$VBG is found each time by calculation or by a method in which the relation of $\Delta$Vout and $\Delta$VBG is maintained as a table and this table then consulted. The calculation method has the advantage that memory need not be prepared for the table. On the other hand, although the table method requires memory for the table, this method has the advantage of enabling high-speed derivation of $\Delta$VBG, particularly when the relation between $\Delta$Vout and $\Delta$VBG is nonlinear.

Figure 24:
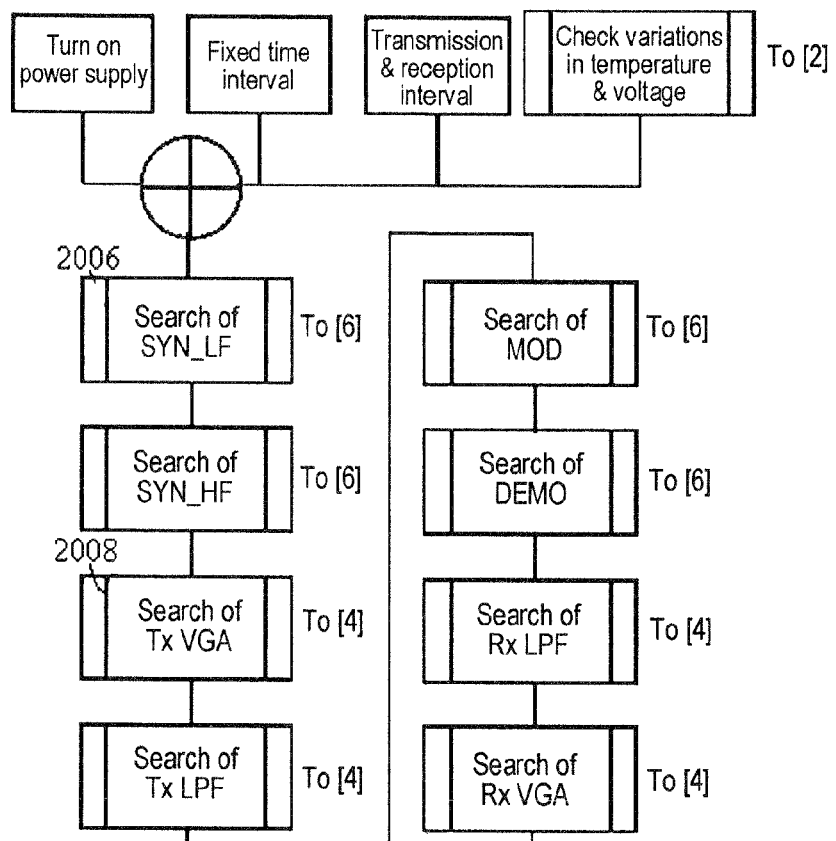
FIG. 24 is a flow chart showing the correction process in the first exemplary embodiment.

On the other hand, instead of uniquely finding $\Delta$VBG based on $\Delta$Vout, it is also possible to carry out an operation of changing $\Delta$VBG and reading $\Delta$Vout several times to search for $\Delta$VBG at which $\Delta$Vout becomes $\Delta$Vout,opt. FIG. 24 shows the process when finding $\Delta$VBG by this type of searching method. When impairment monitoring or correction has been triggered as described above, this type of search is carried out by the sub-routine of [6] of FIG. 25 in synthesizer low-frequency module (SYN_LF) 122 in Step 2006.

Figure 25:
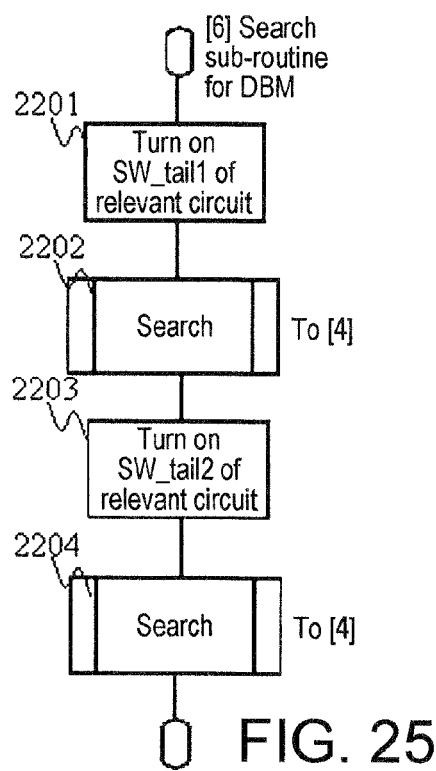
FIG. 25 is a flow chart showing the correction process in the first exemplary embodiment.
Figure 26:
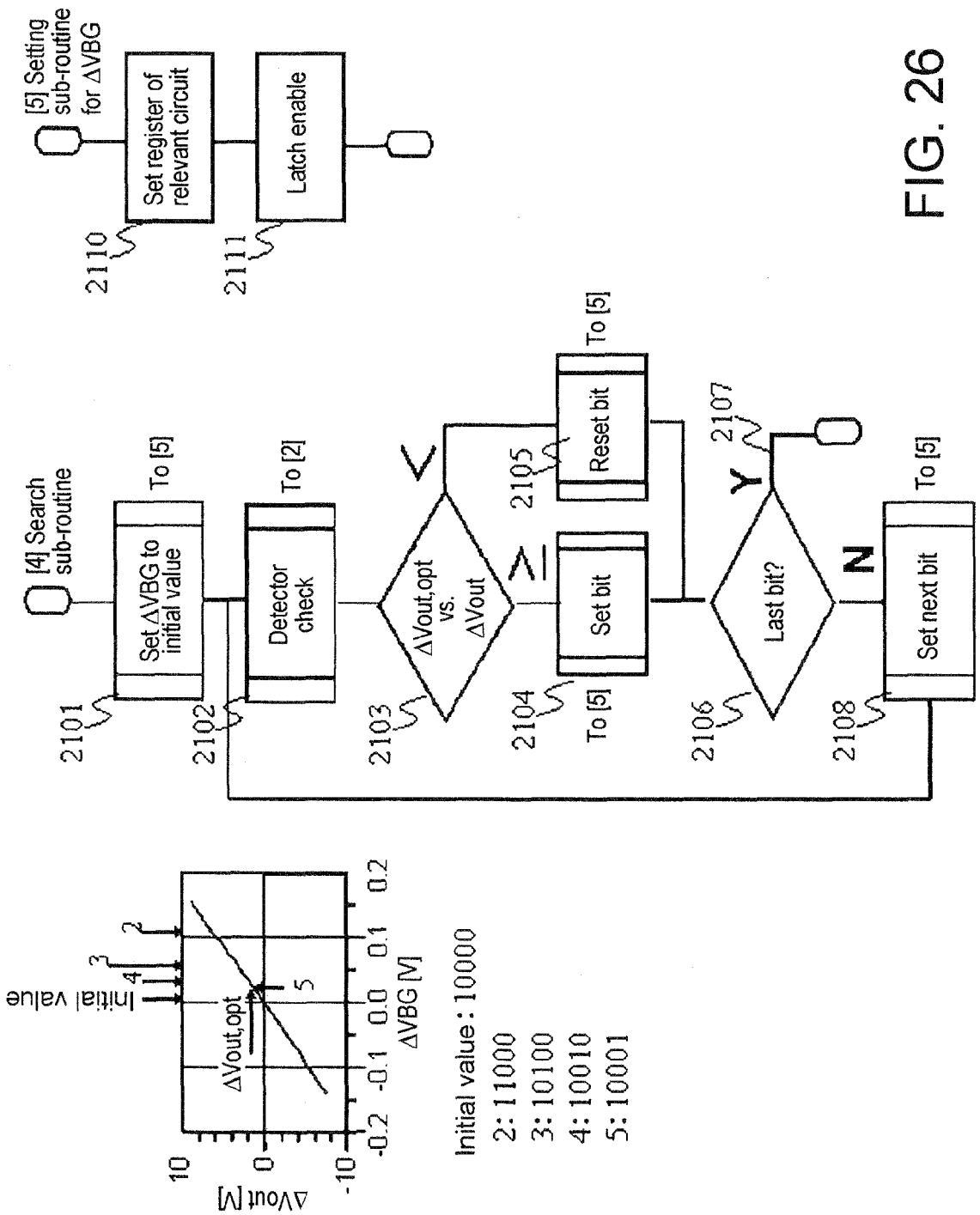
FIG. 26 is a flow chart and graph showing the correction process in the first exemplary embodiment.

The process in the sub-routine of [6] of FIG. 25 is a process for a case in which the search method is applied to a double-balanced mixer wherein: tail switch SW_tail1 of the relevant circuit is first turned ON in Step 2201, following which the search process is executed upon the first set of the two sets of differential pairs by the sub-routine of [4] of FIG. 26 in Step 2202.

The sub-routine of [4] of FIG. 26 shows a search process wherein: the initial value of $\Delta$VBG is first given in Step 2101. As the initial value, $\Delta$VBG is set to, for example, 0V. It is assumed that "10000" is the binary digital value at this time. The check of the detector of the relevant circuit is next carried out in Step 2102, and $\Delta$Vout that has been obtained in Step 2102 is then compared with $\Delta$Vout,opt. If the result of comparison is $\Delta$Vout,opt$\geq$$\Delta$Vout, the first digit MSB of the binary is set in Step 2104. If $\Delta$Vout,opt<$\Delta$Vout in Step 2103, MSB is reset in Step 2105. Next, in Step 2106, a check is carried out to determine if this is the last bit, and if the last bit, this sub-routine ends in Step 2107, but if not the last bit, the next bit is set in Step 2108, following which the process returns to Step 2102 and the detector check repeated. In this way, each bit is successively determined. The graph on the left side of FIG. 26 is a graph for explaining this process, and in this example, $\Delta$VBG is found for which $\Delta$Vout substantially equals $\Delta$Vout,opt in the fifth search. When the sub-routine of [4] of FIG. 26 is completed, the process returns to the process shown in FIG. 25, wherein tail switch SW_tail2 of the relevant circuit is turned ON in Step 2203, and the same search process is executed for the second differential pair in Step 2204. The process of [5] in FIG. 26 shows the sub-routine for carrying out the setting of $\Delta$VBG in Step 2104 or Step 2105 of FIG. 26, and in this case, setting of the register of the relevant circuit is carried out in Step 2110, following which a latch is enabled in Step 2111.

Figure 27:
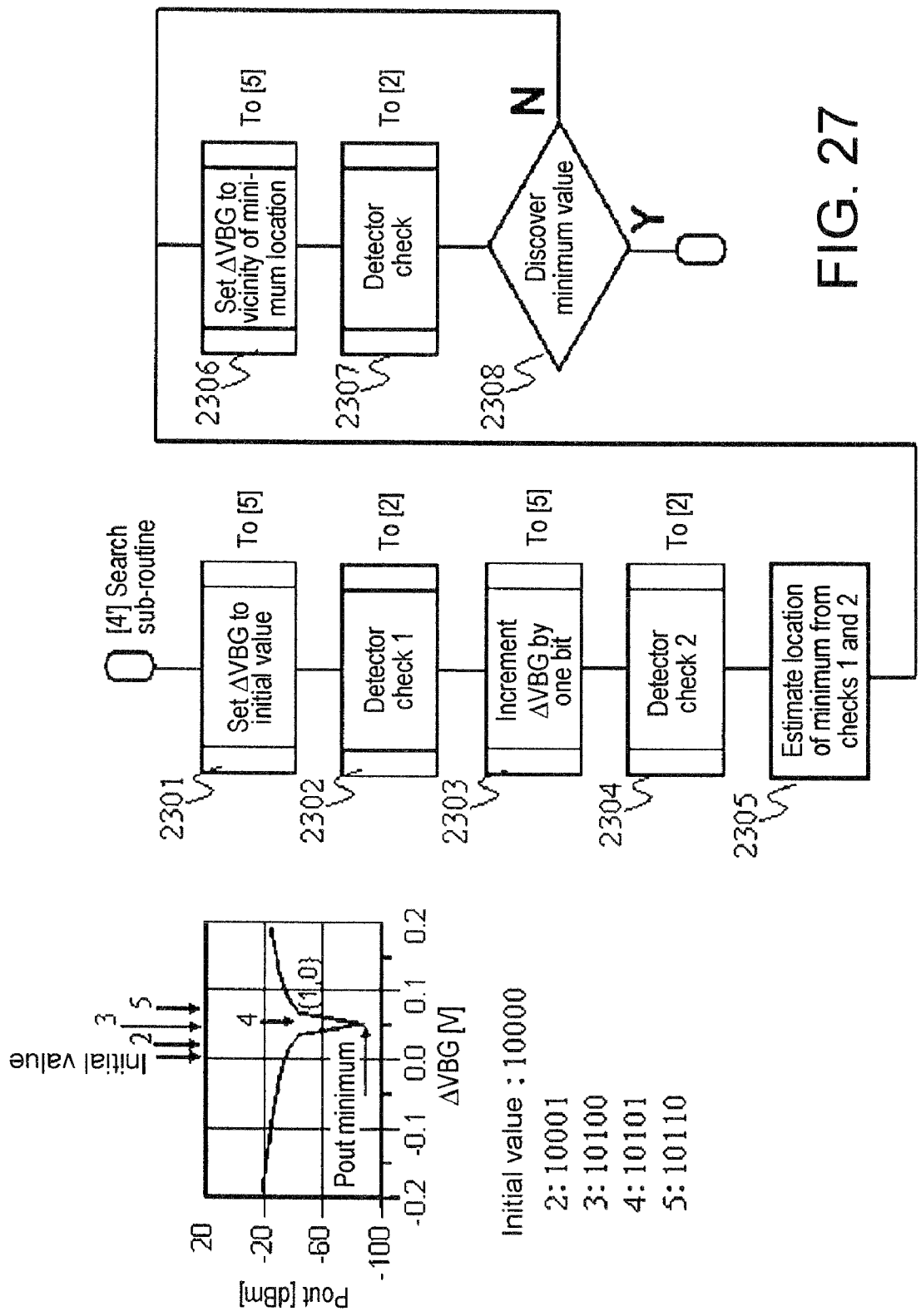
FIG. 27 is a flow chart and graph showing the correction process in the first exemplary embodiment.

The process of [4'] of FIG. 27 is another example of a search sub-routine and can be used instead of [4] of FIG. 26 when a detection circuit is used as the detector. The initial value of ΔVBG is first set in Step 2301, and the detector is next checked as "check 1" in Step 2302. The setting of ΔVBG is next incremented by N bits in Step 2303, and the detector is again checked as "check 2" in Step 2304. In this example, N is 1. In Step 2305, ΔVBG at which local leakage is a minimum is estimated based on the results of "check 1" and "check 2," setting to ΔVBG of the vicinity of the lowest point is carried out in Step 2306, and the detector is checked in Step 2307. It is next determined in Step 2308 whether a minimum value has been discovered, the search process ending if a minimum value has been discovered, and the process returning to Step 2306 if a minimum value has not been discovered. In this way, the process of Steps 2306 to 2308 is repeated to search the vicinity of the estimated value until a minimum value is discovered. This method can be used when the relation between ΔVBG and the detector output is complicated and methods of accurately and uniquely finding ΔVBG based on calculation or a table are problematic and the costs to do so such as the costs of implementation or measurement are high.

The search in synthesizer low-frequency module (SYN_LF) 122 is completed in Step 2006 of FIG. 24 as described hereinabove. The detector check and offset adjustment of synthesizer high-frequency module (SYN_HF) is similarly carried out, and the offset measurement and offset correction of other circuit blocks of hetero circuits are carried out one by one. In the detector checks of circuits such as VGA that have only one differential pair, the sub-routine of [4] of FIG. 26 is directly executed as Step 2008 rather than the sub-routine of [6] of FIG. 25.

Figure 28:
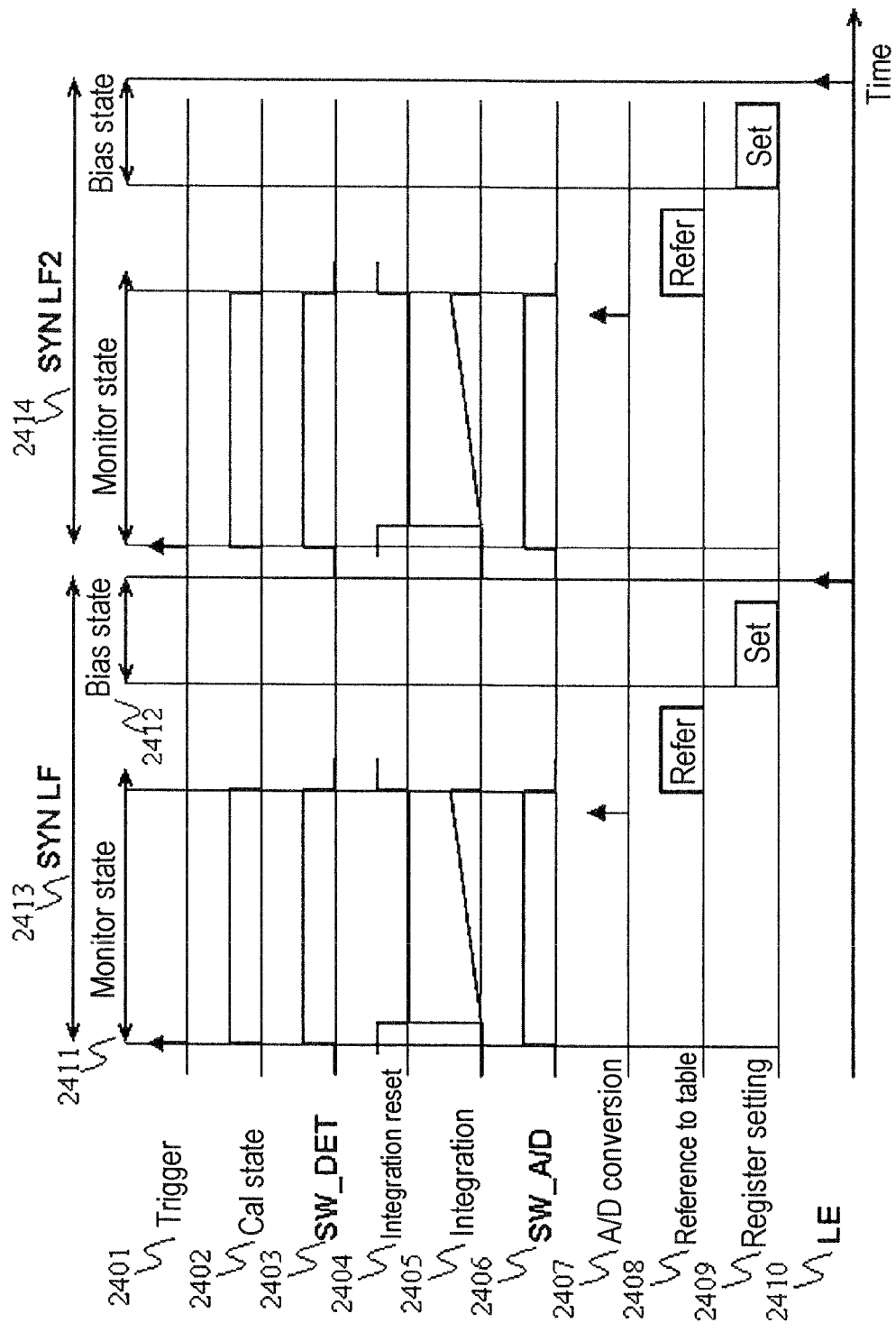
FIG. 28 is a timing chart showing the correction process in the first exemplary embodiment.

FIG. 28 shows a timing chart for a case of uniquely finding and correcting ΔVBG based on calculation or a table. For example, the timing 2413 of synthesizer low-frequency module (SYR_LF) can be broadly divided between monitor states 2411 and bias states 2412. In monitor states 2411, monitor trigger (2401) serves as a motivation in step 2401, and a flag is set for Cal state (2402) for reporting to other blocks that correction is taking place. After detector switch SW_DET (2403) is turned ON and integration capacitor changes from reset (2404) to open state, integration (2405) is carried out. Switch SW_A/D (2406) that connects from the integration circuit to an ADC is turned ON and A/D conversion (2407) is carried out. Reference is then made to, for example, a table (2408) based on ΔVout that has been obtained by the AND conversion to find optimum ΔVBG.

In the bias states 2412, register setting (2409) is carried out and a latch is enabled (LE) (2410). When there are two sets of differential pairs, a tail switch is operated, and the monitor state and bias state are then repeated once as shown at timing 2414.

Figure 29:
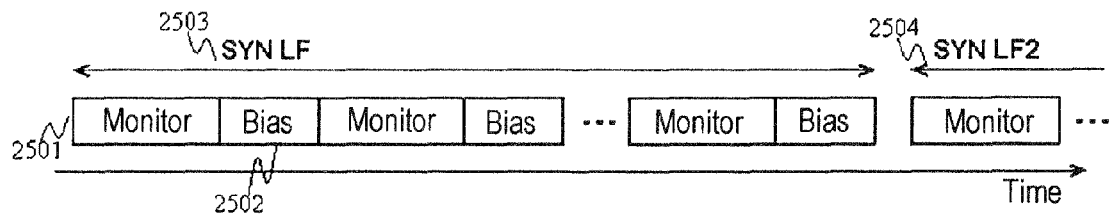
FIG. 29 is a timing chart showing the correction process in the first exemplary embodiment.

FIG. 29 shows the timing when carrying out the search process shown in FIG. 24. For example, in timing 2503 in synthesizer low-frequency module (SYN_LF), monitor state 2501 and bias state 2502 are alternately executed until the search is completed, and transition is made to the next process 2504.

Figure 30:
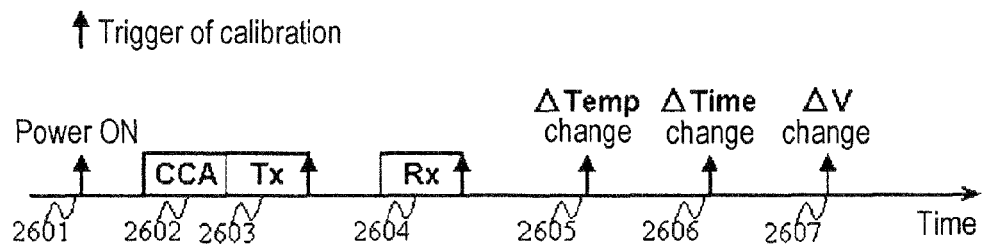
FIG. 30 is a timing chart showing a typical communication process in the first exemplary embodiment.

FIG. 30 is a timing chart showing a typical communication process from turning ON the power supply (power ON). After the power supply is turned ON (2601), clear channel assessment (CCA) (2602) and, as necessary, piconet coordination are carried out. Processes are then carried out for: transmission intervals (Tx) (2603), reception intervals (Rx) (2604), interruptions (2605) of temperature changes (changes in ΔTemp), interruptions (2606) of the passage of fixed time intervals (changes in ΔTime), interruptions (2607) of voltage changes (changes in ΔV), and the like. The above-described monitor states and bias states can be activated with ends or interruptions of these processes as triggers.

Figure 31:
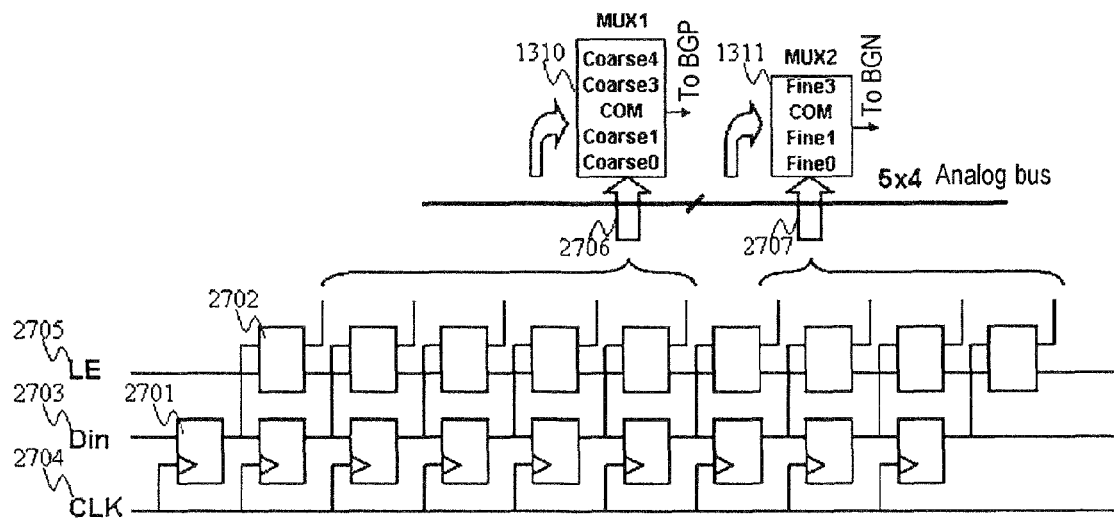
FIG. 31 is a block diagram showing an example of the configuration of a register in the first exemplary embodiment.

FIG. 31 shows an example of register configuration. The register is provided with D flip-flops 2701 realized by, for example, a master-slave configuration, and latches 2702 realized by, for example, a master-only configuration; and data input (Din) 2703, clock input (CLK) 2704, latch enable input (LE) 2705 and the like are further provided. The outputs of the latches are, for example, coarse-adjustment control signals 2706 and fine-adjustment control signals 2707, these signals controlling multiplexer (MUX1) 1310 and multiplexer (MUX2) 1311, respectively.

Second Exemplary Embodiment

Figure 32:
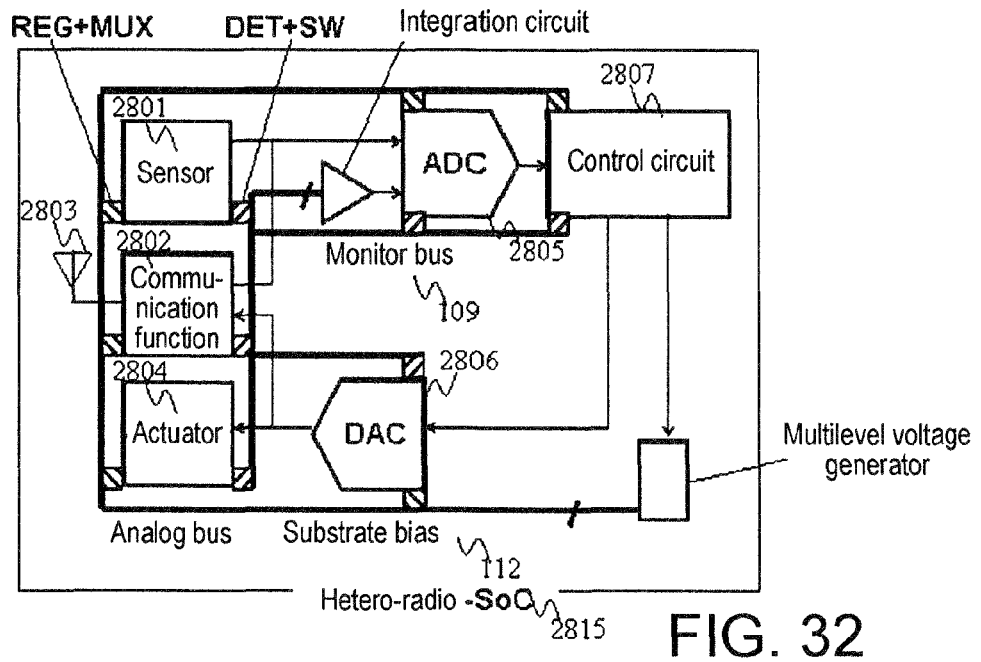
FIG. 32 is a block diagram showing the configuration of a hetero wireless SoC according to the second exemplary embodiment of the present invention.

Explanation next regards the second exemplary embodiment of the present invention. FIG. 32 shows a hetero wireless SoC according to the second exemplary embodiment of the present invention. In the configuration shown in FIG. 32, monitor bus 109 and analog bus 112 are mounted to hetero wireless SoC 2815 that is provided with, for example: sensor 2801, sensor read-out circuit (DET), communication function 2802, antenna 2803, actuator 2804, ADC 2805, DAC 2806, and control circuit 2807. Different types of circuits such as CML (Current Mode Logic), a Gilbert Cell, a pseudo-differential circuit, and a switched transconductance mixer are used in this SoC, and the characteristics variation generated by each these circuits is also different. In this exemplary embodiment, the high flexibility of the monitor bus and analog bus enables correction of characteristics variation such as the spurious components beginning with the local leakage and DC offset of this type of hetero SoC.

Third Exemplary Embodiment

Figure 33:
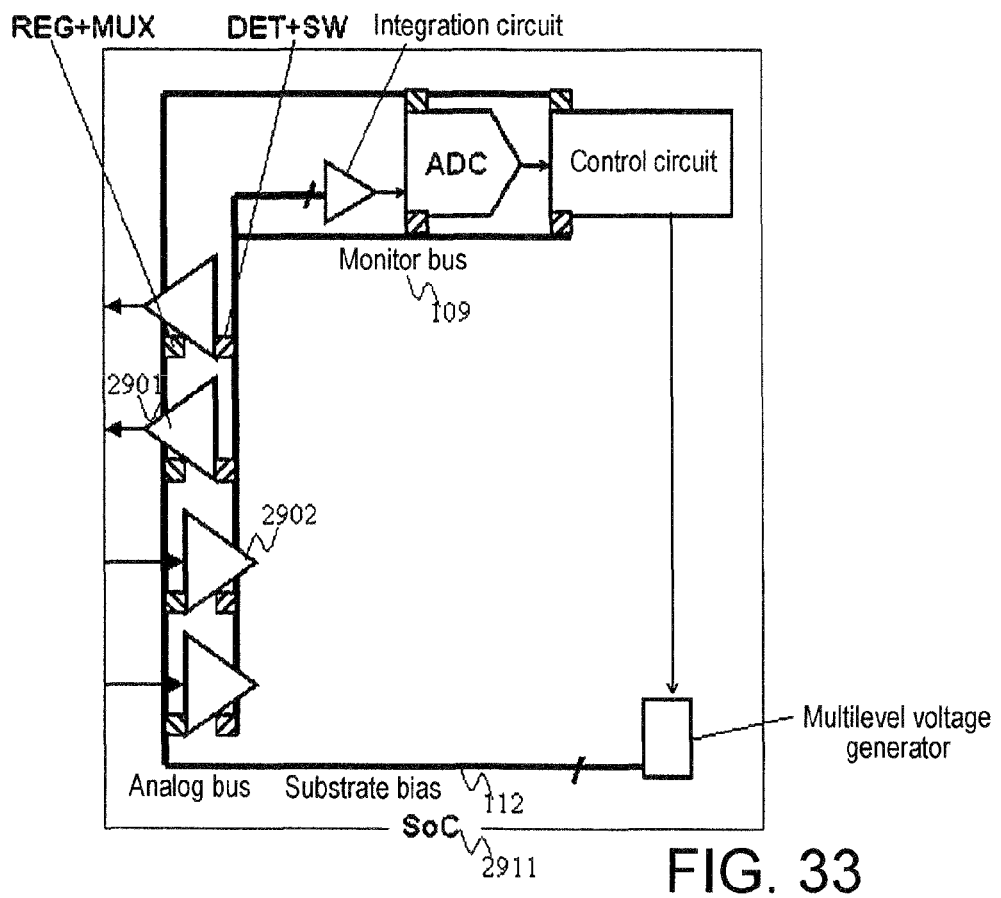
FIG. 33 is a block diagram showing the configuration of a communication SoC according to the third exemplary embodiment of the present invention.

In the third exemplary embodiment shown in FIG. 33, monitor bus 109 and analog bus 112 are mounted on SoC 2911 on which a high-speed serial communication module is mounted. In this exemplary embodiment, characteristics variations such as DC offset in transmission macro 2901 or reception macro 2902 of a high-speed serial communication module are corrected.

[Example of Synthesizer]

FIG. 34 shows an example of a synthesizer for UWB that is used in the present invention. This synthesizer is formed as a multiband generator. PLL 3101 receives reference frequency 3102 and generates a frequency for low frequency LF that is required for generation of a local frequency and a frequency for high-frequency HF. Low-frequency block (LF) 3104 further carries out processes such as frequency-division, and processing on frequency and phase to supply signals to SSB mixer 3106. High-frequency block (HF) 3105 similarly supplies signals that have been processed to SSB mixer 3107. The outputs of SSB mixers 3106, 3107 are amplified in, for example, CML 3108.

[Filter and Amplifier]

Explanation next regards an example of a filter and amplifier that are preferably used in the present invention.

FIGS. 35A to 35C show examples of a low-pass filter, a variable-gain amplifier and the like. The circuit shown in FIG. 35A is provided with: transistors 3301, 3302 for forming a differential pair as a middle-stage; inputs (INP and INN) 3303, 3304 that connect to the gates of the differential pair; back gate ports (BGP and BGN) 3305, 3306 that connect to the back gates of the differential pair; tail-stage transistor 3307; gate bias input (Bias) 3308 of transistor 3307, and the like. This circuit both removes the offset by analog bus and amplifies the differential signal.

The circuit shown in FIG. 35B is provided with: transistors 3311, 3312 that make up a pseudo-differential pair; gate inputs (INP and INN) 3313, 3314 of the pseudo-differential pair; and back gate ports (BGP and BGN) 3315, 3316 of the pseudo-differential pair. Although there is a limit to the removal of the common mode signal that accompanies the pseudo-differential operation in this circuit, the circuit both removes offset and amplifies the differential signal similar to the circuit of FIG. 35A.

A gmC filter is formed in the circuit shown in FIG. 35C. OTA 3321 is provided with back gate ports (BGP and BGN) 3305, 3306; and capacitor 3322 is connected to the differential outputs of OTA 3321. By providing a configuration of this type, a first order low-pass filter is configured, and the offset and filter characteristics of this filter can be adjusted.

Other Exemplary Embodiments

Figure 36B:
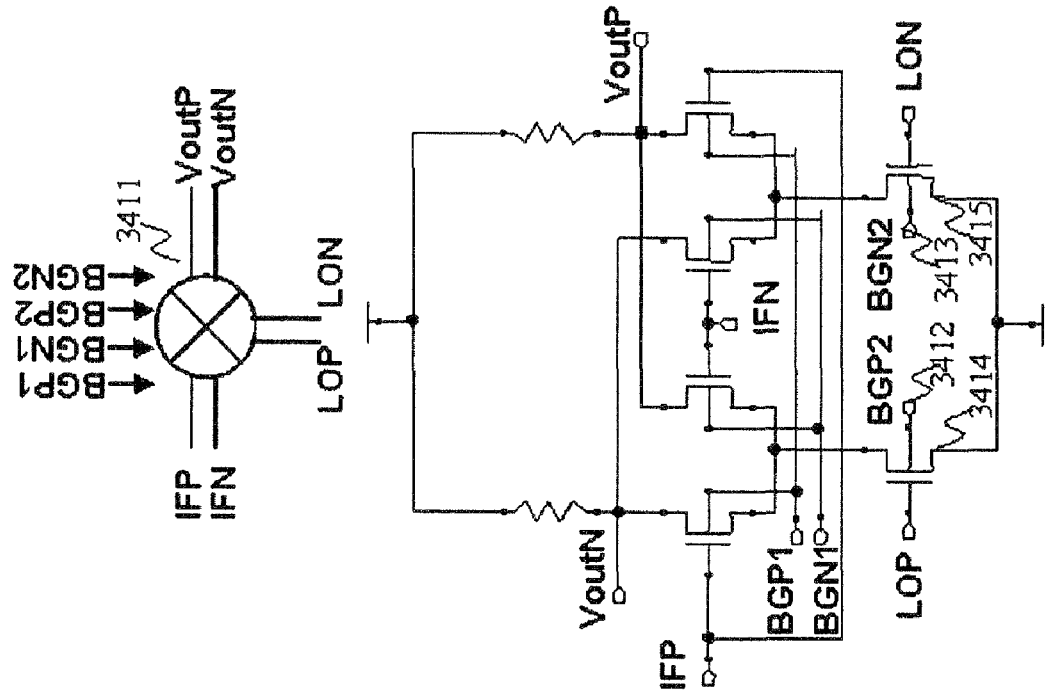
FIG. 36B is a block diagram showing a Gilbert cell of yet another exemplary embodiment of the present invention.
Figure 36A:
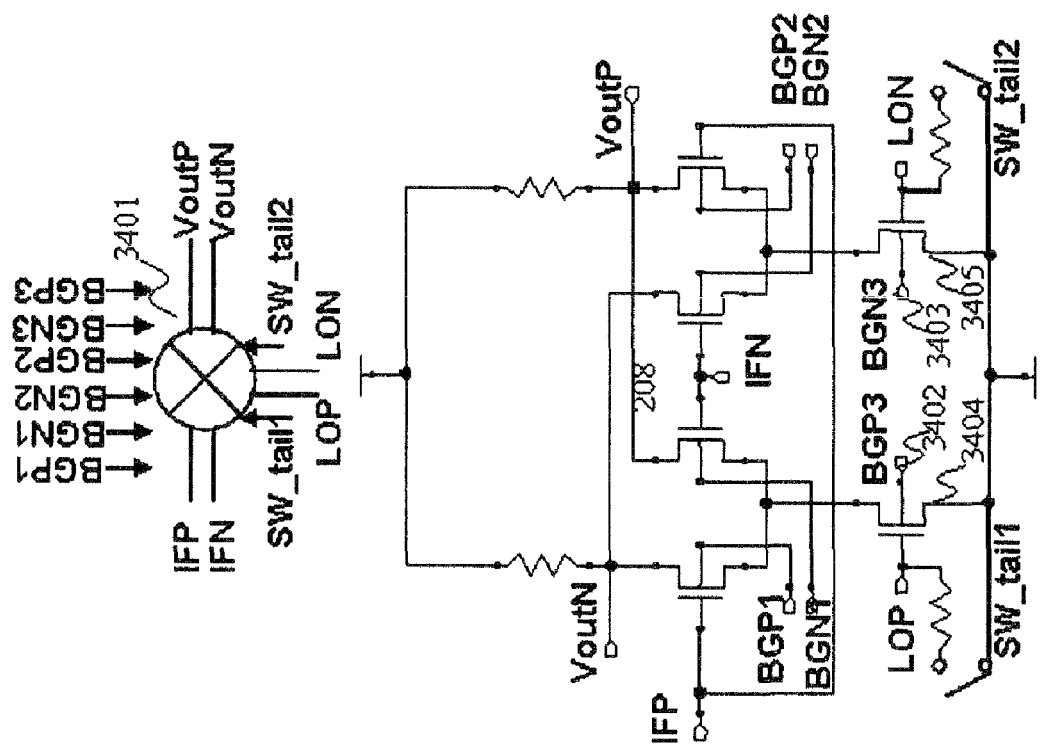
FIG. 36A is a block diagram showing a Gilbert cell of another exemplary embodiment of the present invention.

FIGS. 36A and 36B show Gilbert cells according to other exemplary embodiments of the present invention.

The circuit shown in FIG. 36A is formed as modulator 3401, and is the modulator shown in FIG. 6 further provided with back gate ports (BGP3 and BGN3) 3402 to 3405 in the tail circuit. This Gilbert cell can be applied to correction of higher accuracy.

The circuit shown in FIG. 36B is formed as modulator 3411, and is of a configuration in which back gate ports (BGP3 and BGN3) 3412 to 3415 are provided in the tail circuit in the modulator shown in FIG. 8 that is not provided with a tail switch. This Gilbert cell can also be applied to correction of higher accuracy.

The invention claimed is:

1. A semiconductor device, comprising:
   a plurality of circuit blocks each having functions that are different from one another;
   a plurality of detectors arranged in said plurality of circuit blocks respectively, for detecting a characteristic of each of said plurality of circuit blocks;
   wiring through which DC signal output from each of said plurality of detectors passes, said wiring being shared with said plurality of circuit blocks; and
   a plurality of switches connected to said plurality of detectors respectively, to control sending said DC signal from each of said plurality of detectors to said wiring,
   wherein each said DC signal output from each of said plurality of detectors is read out respectively by operating said plurality of switches in order.

2. The semiconductor device according to claim 1, wherein said plurality of detectors are resistors.

3. The semiconductor device according to claim 1, further comprising:
   a multilevel voltage generator for generating a plurality of dc voltages;
   a multilevel voltage bus for distributing said plurality of dc voltages within a chip; and
   a plurality of switches for selecting a dc voltage from among said plurality of dc voltages and supplying said dc voltage to a corresponding said circuit block as a correction signal.

4. The semiconductor device according to claim 3, wherein said correction signal is supplied to a back gate of a transistor in said circuit block.

5. The semiconductor device according to claim 3, further comprising a control means for, based on correlation between said electrical signal and said correction signal, uniquely determining said correction signal.

6. The semiconductor device according to claim 3, wherein:
   setting of said correction signal and acquisition of said electrical signal are alternately repeated; and
   an optimum correction signal is searched for which said electrical signal is within a prescribed range.

7. The semiconductor device according to claim 1, further comprising a voltage monitor circuit connected to said wiring by way of a switch.

8. The semiconductor device according to claim 1, further comprising a temperature monitor circuit connected to said wiring by way of a switch.

9. The semiconductor device according to claim 3, wherein said plurality of dc voltages are divided into a coarse-adjustment voltage group and a fine-adjustment voltage group.

10. The semiconductor device according to claim 9, wherein center of a voltage range of said fine-adjustment voltage group substantially matches with center of a voltage range of said coarse-adjustment voltage group.

11. The semiconductor device according to claim 1, wherein at least one of said plurality of circuit blocks has a mixer, said mixer comprises:
    a tail transistor for generating a bias current;
    a differential transistor pair connected to said tail transistor, for modulating the bias current; and
    a load through which said modulated bias current flows,
    wherein a correction signal for correction of variation of said plurality of circuit blocks is supplied to a back gate of said differential transistor pair.

12. The semiconductor device according to claim 1, wherein at least one of said plurality of circuit blocks has a mixer, said mixer comprises:
    a tail transistor for generating a bias current;
    a differential transistor pair connected to said tail transistor, for modulating the bias current; and
    a load through which said modulated bias current flows,
    wherein a correction signal for correction of variation of said plurality of circuit blocks is supplied to a back gate of said tail transistor.

13. The semiconductor device according to claim 11, further comprising:
    a multilevel voltage generator for generating a plurality of dc voltages;
    a multilevel voltage bus for distributing said plurality of dc voltages within a chip; and
    switches for selecting one dc voltage from among said plurality of dc voltages;
    wherein said selected dc voltage is said correction signal.

14. The semiconductor device according to claim 12, further comprising:
    a multilevel voltage generator for generating a plurality of dc voltages;
    a multilevel voltage bus for distributing said plurality of dc voltages within a chip; and
    switches for selecting one dc voltage from among said plurality of dc voltages;
    wherein said selected dc voltage is said correction signal.

15. The semiconductor device according to claim 1, further comprising a control circuit for controlling said plurality of switches.

16. The semiconductor device according to claim 1, further comprising an analog-to-digital converter for converting said DC signal received from each of said plurality of detectors via said wiring to a digital signal.

17. The semiconductor device according to claim 1, wherein said plurality of circuit blocks have a prescribed signal path, and are connected to each other in series.

* * * * *